(12) United States Patent
Lopez-Serrano Ramos et al.

(10) Patent No.: US 6,646,028 B2
(45) Date of Patent: Nov. 11, 2003

(54) RUBBER AND CARBON BLACK

(75) Inventors: Francisco Lopez-Serrano Ramos, Metepec (MX); Luis Enrique Mille Loera, Naucalpan (MX); Angel Garcia Garza, Tampico (MX)

(73) Assignee: CID Centro de Investigacion y Desarrollo Tecnologico, S.A. de C.V., Lerma (MX)

( * ) Notice: Subject to any disclaimer, the term of this patent is extended or adjusted under 35 U.S.C. 154(b) by 0 days.

(21) Appl. No.: 10/004,950

(22) Filed: Dec. 5, 2001

(65) Prior Publication Data

US 2002/0111413 A1 Aug. 15, 2002

Related U.S. Application Data

(60) Provisional application No. 60/285,770, filed on Apr. 23, 2001.

(51) Int. Cl.[7] ............................. C08J 3/215; C08J 3/22; C08K 3/04
(52) U.S. Cl. ...................... 523/351; 523/333; 524/496; 524/289; 524/525; 524/804
(58) Field of Search ................................. 523/351, 333; 524/496, 525, 804, 289

(56) References Cited

U.S. PATENT DOCUMENTS

| | | | |
|---|---|---|---|
| 2,538,809 A | * | 1/1951 | Te Grotenhuis |
| 2,786,879 A | | 3/1957 | Kennedy et al. |
| 3,021,226 A | | 2/1962 | Kraus et al. |
| 3,294,733 A | | 12/1966 | Medalia et al. |
| 3,767,605 A | | 10/1973 | Gerlicher |
| 4,029,633 A | | 6/1977 | Hagopian et al. |
| 4,111,867 A | * | 9/1978 | Komuro et al. |
| 4,246,251 A | | 1/1981 | Braddock |
| 4,374,941 A | | 2/1983 | Sandstrom |
| 4,375,497 A | | 3/1983 | Sandstrom |
| 4,481,329 A | | 11/1984 | Ambler et al. |
| 5,159,009 A | | 10/1992 | Wolff et al. |
| 5,352,289 A | | 10/1994 | Weaver et al. |
| 5,547,498 A | | 8/1996 | Sakaue et al. |
| 5,725,650 A | | 3/1998 | Flenniken et al. |
| 5,739,198 A | | 4/1998 | Sandstrom et al. |
| 5,763,388 A | | 6/1998 | Lightsey et al. |
| 5,912,288 A | * | 6/1999 | Nishimoto et al. |
| 6,019,829 A | | 2/2000 | Omae et al. |
| 6,048,923 A | | 4/2000 | Mabry et al. |
| 6,218,465 B1 | * | 4/2001 | Kobayashi et al. |
| 6,245,832 B1 | | 6/2001 | Suzuki et al. |

FOREIGN PATENT DOCUMENTS

| | | | |
|---|---|---|---|
| AU | 199948800 A1 | | 3/2000 |
| AU | 199964471 A1 | | 6/2000 |
| AU | 200036343 A1 | | 11/2000 |
| EP | 0974626 A1 | | 1/2000 |
| GB | 1125801 | * | 9/1968 |
| JP | 2115279 | | 4/1990 |
| JP | 8269361 | | 10/1996 |
| JP | 11131001 | | 5/1999 |
| JP | 11131004 | | 5/1999 |
| JP | 11140371 | | 5/1999 |
| JP | 11148027 | | 6/1999 |
| JP | 11152424 | | 6/1999 |
| JP | 11166145 | | 6/1999 |
| JP | 11199807 | | 7/1999 |
| JP | 11246806 | | 9/1999 |
| JP | 11279770 | | 10/1999 |
| JP | 11286644 | | 10/1999 |
| JP | 11335586 | | 12/1999 |
| JP | 11335587 | | 12/1999 |
| JP | 11335601 | | 12/1999 |
| JP | 11335602 | | 12/1999 |
| JP | 11335603 | | 12/1999 |
| JP | 11335605 | | 12/1999 |
| JP | 11349309 | | 12/1999 |
| JP | 11349848 | | 12/1999 |
| JP | 11349870 | | 12/1999 |
| JP | 11228891 | | 6/2001 |
| WO | WO97/36724 | | 10/1997 |
| WO | WO98/30638 | | 7/1998 |
| WO | WO99/61534 | | 12/1999 |

OTHER PUBLICATIONS

Lattime, "Styrene–Butadiene Rubber", Kirk–Othmer Encyclopedia of Chemical Technology, 1999, pp. 994–1014, vol. 22, New York.

Donnet and Voet, Carbon Black, 1976, pp. 1–12, , Marcel Dekker, Inc., New York.

Donnet, Bansal and Wang, Carbon Black Science and Technology, 1993, pp. 89–173, Marcel Dekker, Inc., New York.

Görl and Schmitt, "Power rubber—a new raw material generation for simplifying production," Rubber World, Mar. 2001, pp. 42–47, USA.

Laube and Zhang, "Reducing non–carbon particles betters carbon black," Rubber and Plastics News, Jul. 1, 2002, p. 16, vol. 31, No. 3, Crain Communications, Inc., USA.

Voet, "The Chemical Nature of the Densification of Carbon Blacks," I&EC Product Research and Development, Sep. 1962, pp. 195–199, vol. 1, No. 3, ACS Publications, USA.

* cited by examiner

Primary Examiner—Tae H. Yoon
(74) Attorney, Agent, or Firm—Vinson & Elkins L.L.P.

(57) ABSTRACT

A process is provided for making a carbon-filled rubber having a uniform dispersion of nanometric-sized carbon black particles. Fluffy carbon black is received as a slurry in water and added to latex rubber before or during coagulation in an emulsion styrene butadiene rubber plant, or fluffy carbon black is similarly incorporated in rubber using a different type of rubber-manufacturing process. A uniform dispersion of smaller-than-usual carbon black particles in rubber is formed, which provides a black masterbatch rubber with superior mechanical and rheological properties. Ash and grit is removed from the fluffy carbon black slurry, which further improves the properties of the carbon-filled rubber by reducing defects in the rubber caused by the ash or grit.

35 Claims, 8 Drawing Sheets

RUBBER AND CARBON BLACK

CROSS-REFERENCE TO RELATED APPLICATION

Priority and benefit is claimed to U.S. Provisional Patent Application Serial No. 60/285,770, filed on Apr. 23, 2001, and this provisional patent application is incorporated by reference for all purposes. Priority and benefit is also claimed to Mexican Patent Application Serial No. 012172, filed in Mexico on Dec. 7, 2000 by Applicant Centro de Investigacion y Desarrollo Technologico, S.A. de C.V., which is also incorporated by reference for all purposes.

FIELD OF THE INVENTION

The present invention pertains to the homogenous incorporation of fillers into rubber, and more particularly to a process for the preparation of rubber containing carbon black of a very small and uniform particle size that is highly and uniformly dispersed.

BACKGROUND OF THE INVENTION

Rubber products, such as vehicle tires and seals are made typically by compounding or mixing fillers, such as carbon black or silica, into rubber, which is then vulcanized. For vehicle tires, additional structural properties are introduced by embedding cords and by using different types of rubber in the tread, side wall and interior lining.

A manufacturer, such as a tire manufacturer, typically receives its raw material from different sources. Rubber is received as bales or possibly as a crumb or as a powder. A rubber manufacturer is located typically geographically separated by a considerable distance from its customer, the tire or rubber product manufacturer. The rubber is transported over considerable distances typically by rail or truck.

A carbon black manufacturer is typically located geographically distant from both the tire or rubber product manufacturer and the rubber manufacturer. Several processes are available for making carbon black, including a thermal black process, an acetylene black process, a lampblack process, an impingement or channel process, and an oil-furnace process. The oil-furnace process is used typically for making carbon black, and in any of these processes, an intermediate is made called fluffy carbon black.

Fluffy carbon black is very difficult to handle. It comprises particles so fine that the particles are measured in nanometers (nm), and it has a very low bulk density. Fluffy carbon black is typically pelletized with the addition of water and an agglomerating agent to yield a pelletized product that can be handled. Other types of agglomerates such as granules, powder and beads can be used. The wet pellets are dried, typically in rotary drums, and dry pellets are transported by truck or rail in bags or the like to the tire or rubber product manufacturer.

The tire or rubber product manufacturer receives the dry pellets and grinds the pellets by mechanical means to essentially as small a particle size as can be practically achieved. The ground carbon black typically has a particle size ranging between about 0.5 microns and about 45 microns. The ground carbon black is mixed with the rubber in a process called dry compounding. Mechanical mixing is used in the dry compounding process to intimately mix the carbon black with the rubber.

Alternatively, the dry pellets of carbon black are transported to a rubber manufacturing plant, which is typically geographically separated from the carbon black plant by a considerable distance. At the rubber plant, the dry pellets of carbon black are ground into as small a particle size as is practical using essentially the same grinding process as would otherwise have been used at the tire or rubber product manufacturer. The ground carbon black has a particle size distribution ranging between about 0.1 microns and about 7 microns.

The dry ground carbon black is mixed with water to form a slurry that is added to an intermediate step in the process for making the rubber, typically in a coagulation step. The carbon black is mixed with the rubber as the rubber is made, resulting in a product called black masterbatch. Black masterbatch is thus a rubber product that already has carbon black dispersed through it. The black masterbatch can be handled and transported to the tire or rubber product manufacturer in bales or as crumb or dry powder in the same manner as rubber without carbon black can be handled and transported.

A rubber manufacturing plant that makes black masterbatch typically uses styrene and butadiene as raw materials although other types of rubber can be used, such as acrylonitrile and butadiene. One of two processes is typically used for making rubber from styrene and butadiene. One process is called emulsion styrene-butadiene rubber (ESBR), and the other process uses organolithium compounds in an ionic polymerization for making what is called solution styrene-butadiene rubber (SSBR). Fillers are typically added to rubber, and the most common filler is carbon black since it is a reinforcement agent as well as a filler.

Mechanical and rheological properties of rubber are influenced by different factors that can vary from the styrene-butadiene ratio to the way in which vulcanization is performed, whenever these are vulcanized. Naturally, the amount and the way in which carbon black is incorporated into the rubber also affect the final properties of materials.

SUMMARY OF THE INVENTION

A process is provided for making a carbon-filled rubber that includes the steps of forming a rubber intermediate; adding a fluffy carbon black stream to the rubber intermediate; incorporating fluffy carbon black to form a rubber having carbon black dispersed therethrough; and processing the mixture of carbon black and rubber to form a carbon-filled rubber. In one embodiment the rubber intermediate is a latex in an emulsion styrene-butadiene plant. The fluffy carbon black stream is preferably received as a slurry of fluffy carbon black in water; and optionally, a dispersant can be added to aid in dispersing the fluffy carbon black in the water to form the fluffy carbon black slurry. The dispersant is preferably a naphthalenesulfonate composition although other dispersants can be used. Preferably, the average particle size of the fluffy carbon black intermediate is less than about 1000 nm when dispersed in water, and/or about 95% of the carbon black particles may be less than 2000 nm.

BRIEF DESCRIPTION OF THE DRAWINGS

The present invention will be better understood when the description of the following detailed invention is read in conjunction with the figures.

DETAILED DESCRIPTION OF THE INVENTION

The present invention includes an integrated plant for making black masterbatch rubber, which is a rubber material containing carbon black having a very small particle size wherein the carbon black is distributed uniformly through the rubber. The present invention can be better understood in light of the prior art in which a rubber plant, a carbon black plant and a tire or rubber product manufacturer were geographically dispersed.

Figure 1:
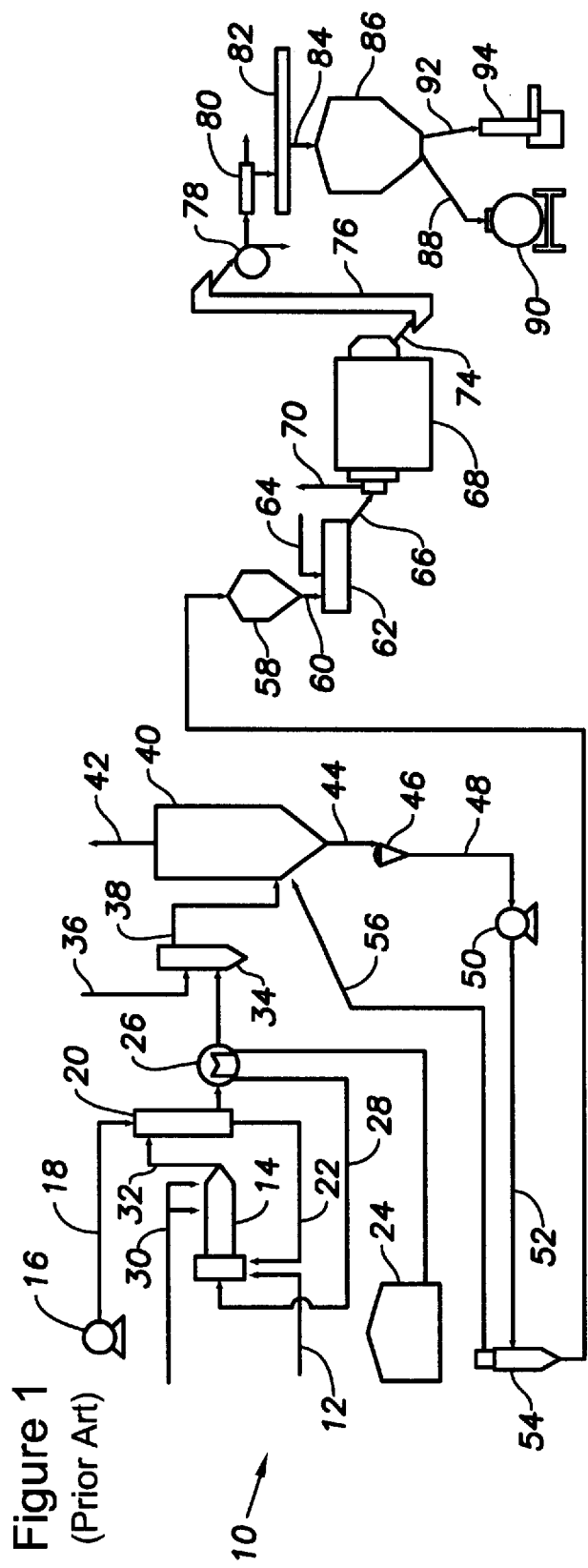
FIG. 1 is a simplified process flow diagram of a prior art carbon black plant.

With reference to FIG. 1 and as described in volume 4 of Kirk-Othmer on carbon black in the *Encyclopedia of Chemical Technology* by John Wiley & Sons, 1991 edition, a prior art carbon black manufacturing process 10 is illustrated schematically. A fuel 12, such as natural gas, is fed to a reactor 14, which operates typically in the range of 1200 to 1900° C. A blower 16 draws in ambient air and conveys it through a line 18 to an air preheater 20. Air preheater 20 is a heat exchanger that transfers heat from the reaction products from reactor 14 to the process air, which is fed through line 22 to reactor 14.

A liquid, oil-based feedstock is stored in a storage tank 24 and is preheated in a heat exchanger 26 by reaction products from reactor 14 after the reactor products pass through air preheater 20. The liquid feedstock flows through line 28 from oil preheater 26 to reactor 14. Fuel 12 mixes with the preheated air in line 22 and burns in reactor 14 to create a high-temperature environment. Feedstock flowing through line 28 is atomized and injected into a combustion zone of reactor 14, where the feedstock vaporizes essentially instantly and decomposes to primarily carbon black and hydrogen. A portion of the feedstock also reacts with excess oxygen in the process air to maintain a proper reaction temperature for the formation of carbon black.

Quench water is introduced to reactor 14 through line 30 to quickly quench the reaction products flowing out of the combustion zone of reactor 14. The quenched reaction product, which is a heavy carbon black smoke, flows through line 32 to air preheater 20. The hot carbon black smoke is cooled as it passes through air preheater 20 and then through oil preheater 26. The carbon black smoke flows from oil preheater 26 into a quench tower 34. Quench water is fed to quench tower 34 through line 36, and the carbon black smoke is further cooled as it flows through quench tower 34. The carbon black smoke is then fed through line 38 to a bag filter unit 40.

Bag filter unit 40 separates the carbon black smoke into an intermediate called fluffy carbon black and a tail gas stream. The tail gas stream or off-gas is vented from bag filter unit 40 through line 42, which can be fed as a supplement to fuel 12.

The fluffy carbon black flows through line 44 into a micro-pulverizer 46, which agitates and agglomerates the fluffy carbon black to increase its bulk density. The fluffy carbon black then flows through line 48 into a blower 50, which conveys the fluffy carbon black through a line 52 to a cyclone 54. Cyclone 54, which may be a set and/or series of cyclones, separates the fluffy carbon black from the air used to convey the fluffy carbon black through line 52. Air and any fluffy carbon black that escapes through cyclone 54 is returned to bag filter unit 40 through line 56. Fluffy carbon black product flows into a surge tank 58 for short-term storage to compensate for an unequal flow rate into and out of storage tank 58.

The fluffy carbon black product flows out of a hopper in the bottom of surge tank 58 through a line 60 into a pelletizer 62. Water is added through a line 64 to pelletizer 62 to aid in agglomerating the fluffy carbon black intermediate into wet pellets.

The wet pellets from pelletizer 62 flow through a line 66 into a rotary dryer 68. Rotary dryer 68 is heated, such as by combustion of natural gas, and the wet pellets of carbon black are dried as the pellets flow through the rotary dryer. Water vapor and gases are exhausted from rotary dryer 68 through a line 70 to a purge gas filter (not shown).

Dry pellets exit rotary dryer 68 through a line 74 into an elevator 76. The dry carbon black pellets are dropped onto a rotating drum magnet 78 that separates any pellets containing metal from the dry carbon black pellet. The dry pellets are dropped onto a screen 80, which has a screen of a desired mesh size, and dry pellets having the proper size pass through the screen onto screw conveyors 82. Screw conveyors 82 transport the dried and pelletized carbon black through a line 84 into storage tanks 86.

Final product dry carbon black pellets can be conveyed through line 88 to a rail car or tank truck 90 for bulk loading.

Alternatively, dry carbon black pellets can be conveyed through line 92 to a packaging unit 94, where the dry pellets are typically bagged. The bulk or bagged dry carbon black pellets can then be transported to a tire or rubber product manufacturer, according to this prior art process.

Figure 2A:
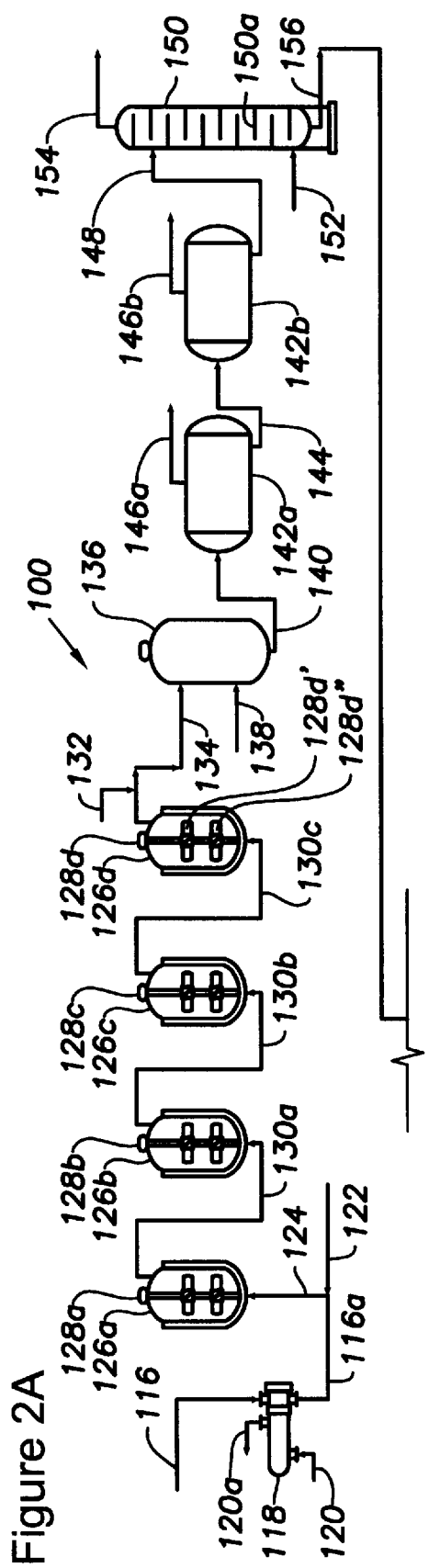
FIGS. 2A and 2b are a simplified process flow diagram of a rubber manufacturing plant that incorporates fluffy carbon black, according to the present invention.
Figure 2B:
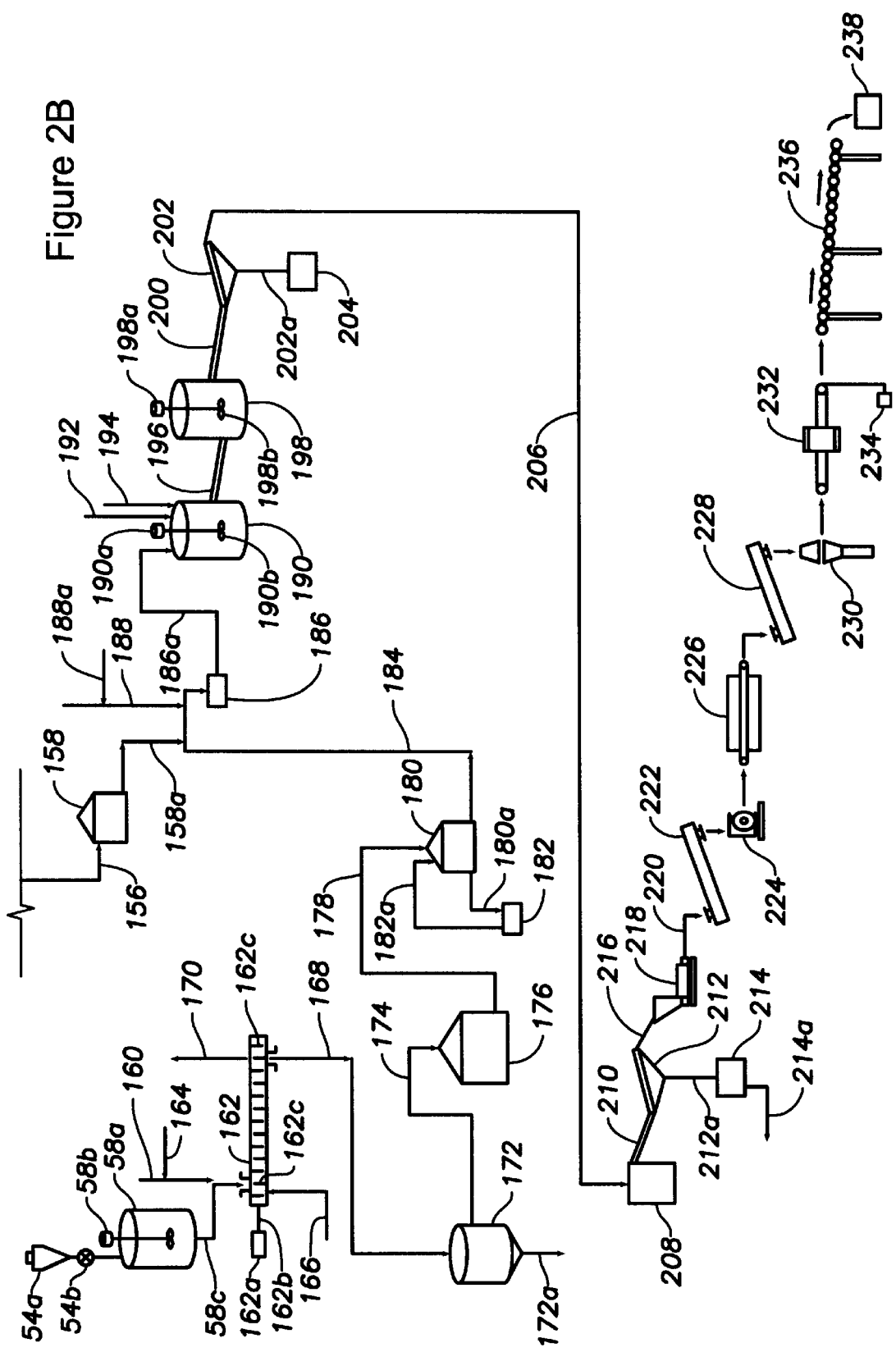

Turning now to FIGS. 2A and 2B, a process 100 for making rubber and incorporating carbon black, according to the present invention, is shown schematically. This embodiment of the present invention is illustrated for a styrene butadiene rubber (SBR) plant, in particular an emulsion SBR plant, but the present invention includes any process for making a rubbery material having a uniform dispersion of carbon black, including solution SBR, acrylonitrile butadiene rubber, high styrene rubber, and natural rubber, with or without additional co-monomer to provide functional group such as carboxylic acid or acrylic monomer. Thus, carboxylated styrene butadiene rubber and carboxylated nitrile butadiene rubber are included, and the carboxylate used for making carboxylated styrene butadiene rubber or carboxylated nitrile butadiene rubber can be selected from the group consisting of carboxylic, maleates, acrylic, alcohol, amine and epoxy monomers.

Emulsion SBR (ESBR) polymerization is based on free radicals that attack unsaturated monomers of styrene and butadiene, which causes the monomer units to bond together at the end of, and extending, the polymer chain. Solution SBR (SSBR) polymerization is based on an ionic mechanism. The rubber product from an ESBR plant is somewhat different as compared to the rubber product from an SSBR plant, but the process is and products are more similar than they are different. The present invention has applicability for both of these types of rubber plants as well as to other processes for making somewhat different rubber products. The processes can be batch, semi-batch or continuous as well as cold or hot.

In the simplified flow diagram shown in FIG. 2A, styrene and butadiene monomers are mixed together in water, which is the solvent in the ESBR process, and additives including a modifier, an emulsifier and an activator are added to the solution to form a feed stream 116. Feed stream 116 is fed to a heat exchanger 118 that removes heat from the feed stream. A coolant supply 120 flows into heat exchanger 118, and a coolant return 120a flows out of heat exchanger 118, where coolant return 120a is at a higher temperature than coolant supply 120. Feed stream 116 flows through line 116a, and an initiator is added to feed stream 116 via line 122.

Feed stream 116 with the initiator flows through line 124 into a series of reactors 126a, 126b, 126c and 126d, which may be referred to as reactors 126 for simplicity. Reactors 126a, 126b, 126c and 126d have agitators 128a, 128b, 128c and 128d, respectively, which may be referred to as agitators 128. As shown for example with reference to reactor 126d, agitator 128d has paddles 128d' and 128d". Each of reactors 126 is configured in a similar manner. Reactors 126 are arranged in series. Feed stream 116 flows into reactor 126a through line 124 and out through line 130a into reactor 126b out through line 130b into reactor 126c out through line 130c into reactor 128d.

Polymerization occurs as the material flows through reactors 126, the styrene and the butadiene monomer units adding to the end of polymer chains and increasing the polymer chain length. Polymerization continues as long as styrene and butadiene monomer units are available in the solution. To stop the polymerization at a desired polymer chain length, a chemical called a short-stopping agent is added either to one of the reactors 126 or to the reactor product stream. The short-stopping agent is a reducing agent that combines with a growing species to destroy the source of free radicals, which stops the addition of monomer units to the polymer chains. A low concentration of hydroquinone is an effective short-stopping agent, although other reducing agents can be used.

As shown in FIG. 2A, the short-stopping agent is added to the reactor product stream through a line 132 making a short-stopped latex that flows through line 134 into a blowdown tank 136. Steam is added through a line 138 to blowdown tank 136, which heats the latex and strips out styrene and butadiene monomer from the aqueous latex stream. A gas stream containing styrene, butadiene and water vapor, as well as any other volatile material, is removed through a line (not shown) from the overhead of blowdown tank 136 and sent to a recovery unit (not shown) for recovery of styrene and butadiene monomer. The latex stream flows from blowdown tank 136 through a line 140 into a first flash tank 142a through a line 144 into a second flash tank 142b. Butadiene monomer flashes off from the latex stream in flash tanks 142a and 142b and is sent to the recovery unit through lines 146a and 146b, respectively, for recovering and recycling the butadiene monomer.

Having been stripped of essentially all butadiene through flash tanks 142, the latex stream flows through line 148 into a stripping column 150. Stripping column 150 has a series of plates 150a, which may be perforated plates, bubble cap distillation trays, or any other technology suitable for stripping styrene and any remaining butadiene from the latex stream. Steam is added to stripping column 150 through line 152, and styrene is recovered overhead and transferred via a line 154 to the recovery unit to recover and recycle the styrene monomer. A stripped latex stream flows from the bottom of stripping column 150 through a line 156 to a plurality of latex storage tanks, of which one is shown as tank 158 in FIG. 2B.

Turning to FIG. 2B and with reference to FIG. 1, fluffy carbon black intermediate is separated from an air stream in a cyclone 54a and passed through a valve 54b into a surge tank 58a. The numbers with suffixes used for the cyclone and surge tank indicate that these can be cyclone 54 and surge tank 58 shown in FIG. 1. However, fluffy carbon black can be withdrawn from a carbon black plant at other locations, including before or after a filter unit, such as bag filter unit 40 shown in FIG. 1. Further, the rubber and carbon black plant of the present invention can differ in other ways from carbon black plant 10 shown in FIG. 1. For example, quench tower 34 can be replaced with a venturi cooler where water is injected into hot carbon black smoke as it flows through a throat in the venturi cooler.

In one embodiment of the present invention, fluffy carbon black intermediate is withdrawn from a carbon black plant at a point in the carbon black manufacturing process before the pelletizer, such as before pelletizer 62 shown in FIG. 1. The carbon black intermediate used in a process according to the present invention has not been pelletized or otherwise agglomerated so that the smallest, finest particles of carbon black in a carbon black plant are used in the present invention. The fluffy carbon black intermediate used in the present invention is referred to as fluffy carbon black as distinguished from pelletized or agglomerated carbon black.

In this embodiment, surge tank 58a is shown as having an agitator 58b for keeping the fluffy carbon black in a fluidized state. (It may be found desirable to avoid agitation of dry fluffy carbon black to prevent agglomeration of particles. It may be preferable to form a slurry using the venturi cooler.) Dry fluffy carbon black flows from surge tank 58a through line 58c into a mixer 162, and water is also added through a line 160 to mixer 162.

Since water is mixed with dry fluffy carbon black, surge tank 58a for dry carbon black may not be necessary as a slurry of fluffy carbon black and water can be produced and stored, which may minimize the formation of agglomerates of fluffy carbon black particles. One goal of the present invention is to use the ultra fine particle size of fluffy carbon black as opposed to agglomerated or ground carbon black. The characteristics of the tire or rubber product formed using the rubber and carbon black product of the present invention have been found highly desirable as compared to similar tires and rubber products made using carbon black that is agglomerated or mechanically ground. In a process according to the present invention, fluffy carbon black is added to the latex before a coagulation step, which is described below, and the use of fluffy carbon black, which has never been pelletized, yields a rubber product having very desirable characteristics as will be explained further below.

With continuing reference to FIG. 2B, water is added through line 160 to mixer 162 at a rate to yield a slurry of fluffy carbon black and water having a concentration of carbon black in the slurry that ranges between about 0.5 weight percent and about 50 weight percent, preferably ranging between about 1 weight percent and about 20 weight percent, and more preferably ranging between about 3 weight percent and about 12 weight percent, and most preferably ranging between about 5 weight percent and about 8 weight percent. In the present embodiment about 7 weight percent of carbon black in the fluffy carbon black slurry is used.

A dispersing agent may be added through line 164 to mixer 162 for aiding in the mixing of the dry fluffy carbon black with the water. Depending on the concentration of fluffy carbon black in the slurry, it may be possible to omit the use of a dispersing agent. However, sodium naphthalenesulfonate polymer with formaldehyde, which is sold under U.S. Registered Trademarks of Criosotan and Daxad, may be used, preferably at a concentration of less than about twenty parts of dispersing agent per hundred parts carbon black, preferably at a concentration of less than about eight parts per hundred parts carbon black and more preferably at about one part dispersing agent per hundred parts of carbon black. Daxad dispersing agent may be obtained from Hampshire Chemical Corporation, a subsidiary of Dow Chemical Company. Other dispersing agents that may possibly be used include alkylene oxide block copolymer sold under the U.S. Trademark Registration Hydropalat 1080, sulfosuccinamate such as octadecyl sulfosuccinamate, tretrasodium sulfosuccinamate tricarboxilate, sodium dioctyl sulfosuccinamate, tretrasodium N-(1,2-dicarboxyethyl)-N-octadecyl sulfosuccinamate, sodium bis(tridecyl) sulfosuccinamate, phosphate chemicals including monoester phosphate and diester phosphate.

Mixer 162 can be of any design suitable for intimately mixing dry carbon black with water. Mixer 162 is shown in this embodiment as a horizontal mixer having a motor 162a that rotates a drive shaft 162b to which is connected a series of blades 162c. High pressure steam is added through a line 166 for heating the slurry and promoting further agitation for mixing the dry fluffy carbon black with the water. The solution of fluffy carbon black, water and dispersing agent flows through mixer 162, and a fluffy carbon black slurry exits mixer 162 through a line 168. Any volatile material, gases and dust from the fluffy carbon black are vented through a line 170 to either an appropriate recovery unit or to an appropriate environmental control unit.

The fluffy carbon black slurry flows through line 168 into a settling tank 172, where grit and/or inorganic salts or the like settle out for removal and discard through a line 172a. Settling tank 172 may be referred to as a de-gritting unit or as a de-gritter. The separation of this solid material that settles out when fluffy carbon black is mixed with water is an unexpected result discovered in this process, which leads to additional desirable characteristics in the product of this process. The solid material withdrawn through line 172a from settling tank 172 would otherwise become ash or a hard spot in a tire or other rubber product. Such ash would be a defect in a tire or rubber product composition, and such a defect is essentially eliminated in the process of the present invention.

This separation of a solid material from a slurry of fluffy carbon black and water was discovered during laboratory testing that lead to a process for making black masterbatch according to the present invention. The source of the solids removed from the fluffy carbon black slurry through line 172a from settling tank 172 may be the oil used as a feedstock to the carbon black reactor. If the oil feedstock to the carbon black reactor has a low enough concentration of ash to meet one's desired specifications in the product from a process according to the present invention, then it may not be necessary to include settling tank 172, but it is believed desirable to include settling tank 172 in this process. The product from this process is generally considered better if settling tank 172 is included, but on the other hand, the characteristics of the product are acceptable without settling tank 172 in many if not most applications.

A de-ashed fluffy carbon black slurry flows through a line 174 into a storage tank 176 and is withdrawn from storage tank 176 at a desired rate through a line 178 to a process tank 180. As shown with respect to tank 180, but applicable for any storage for fluffy carbon black slurry, it may be desirable to include a disperser 182 for maintaining the fluffy carbon black in solution so that the fluffy carbon black does not settle out of solution into the bottom of a tank. Fluffy carbon black solution is withdrawn from tank 180 through a line 180a into mechanical disperser 182 and returned through a line 182a to tank 180.

As shown with continuing reference to FIG. 2B, a low concentration of fluffy carbon black in water, fluffy carbon black slurry, flows through line 184 into a mechanical disperser 186, and latex rubber solution from tank 158 flows through a line 158a into mechanical disperser 186, which mixes the fluffy carbon black slurry with the latex rubber solution. Additives, such as oil, are added through line 188, and an antioxidant is added through a line 188a. Although a static mixer may be satisfactory for mechanical mixer 186, high shear rotors are preferred, but possibly a tank and agitator can be used as well. For example, a cream tank with an agitator may provide satisfactory results. The dispersion of carbon black in the final rubber-carbon black product may depend on how well the fluffy carbon black slurry is mixed with the latex rubber solution in this step.

The mixture of latex and fluffy carbon black slurry is fed to a coagulation tank 190 through a line 186a. Sulfuric acid is added through a line 192 to coagulation tank 190, and serum is added through a line 194. A coagulation aid is typically added, possibly through line 194 or through line 188. A polyamide, such as sold under the registered U.S. trademark Perchem, can be used as the coagulation aid. The concentration of coagulant aid in the serum in tank 190 is maintained at a desired concentration, typically at less than about 200 or so parts per million (ppm), preferably between about 50 ppm and about 150 ppm, and more preferably at about 100 ppm.

The solution of fluffy carbon black slurry, latex rubber, antioxidants and oil, if extended by oil, is agitated in coagulation tank 190 by an agitator 190a that has paddles 190b. Agitation is one of many variables that can be manipulated to yield a desired rubber product from the coagulation tank. One may prefer a crumb rubber without excessive fines for a desired extrusion. One may prefer to evaluate the impact of mixing in coagulation tank 190 on product properties as well as the impact of mixing in mixer or mechanical disperser 186. It is believed that the greater the extent of dispersion of the fluffy carbon black particles in the rubber, the better the properties of the rubber-carbon black product. It is further believed that the smaller the particle size of the fluffy carbon black, the better the properties of the rubber-carbon black product, which is a black masterbatch.

A rubber product is formed according to the present invention in coagulation tank 190 as the latex coagulates to form rubber and incorporates the fluffy carbon black in its matrix during rubber formation. As compared to operating a coagulation tank without the addition of the fluffy carbon black slurry, the coagulation tank is preferably operated at a slightly lower pH and at a slightly higher temperature. While a prior art coagulation tank may have been operated at a pH between about 4 and about 6, coagulation tank 190 may be operated according to the present invention at a pH ranging preferably between about 3 and about 5, although it is possible to achieve satisfactory results within a different pH range, possibly including a pH higher than 7, but more likely in the range of about 2 or 2.5 to about 7.

Sulfuric acid is typically added for coagulation of soap in the latex solution to form rubber, but other acids can be used, possibly including hydrochloric acid for example. In making natural rubber, sodium chloride and/or aluminum sulfate may be used. Solution SBR, acrylonitrile butadiene rubber and high styrene rubber may each have different requirements. In the embodiment described here, the flow rate of sulfuric acid is manipulated to control pH at a desired level.

As for operating temperature, a prior art coagulation tank may have operated between about 55° C. and about 65° C., particularly at about 60° C. Coagulation tank 190 is preferably operated at a slightly higher temperature, possibly from about 2° C. to about 15° C. or about 2° C. to about 10° C. higher, but preferably about 5° C. higher than a prior art coagulation tank may have operated. For this embodiment, coagulation tank 190 preferably operates at a temperature between about 57° C. and about 80° C., preferably in a range between about 57° C. and about 75° C. and more preferably in a range between about 65° C. and about 75° C. Coagulation tank 190 can operate at about 70° C.

The concentration of antioxidant in coagulation tank 190 is about the same in the process according to the present invention as in a prior art process that does not add fluffy carbon black to coagulation tank 190, which is about 0.015 weight percent antioxidant in the serum in coagulation tank 190.

The reaction products from coagulation tank 190 flow through a line 196 into a conversion tank 198, where the conversion to a rubber product according to the present invention is completed. The rubber product contains a highly dispersed matrix of extremely small particles of carbon black, where the size of the carbon black is believed to be the size of the fluffy carbon black particles as produced in the carbon black plant since pelletizing (agglomeration) has been avoided.

Consequently, the particle size of the carbon black in the rubber product in conversion tank 198 is believed to have an average particle size of less than 1,000 nm, possibly between about 400 to 800 nanometers, and the particle size distribution of carbon black in the rubber product is believed to range between about 100 nm and about 2,000 nm. The size of particles in rubber made by incorporating fluffy carbon black into the latex is believed to be smaller than the size of carbon black particles incorporated into rubber through prior art methods. The smaller size of the carbon black particles in the rubber of the present invention and the uniformity of the dispersion of the carbon black in the rubber yields a rubber-carbon black product with superior performance characteristics as will be explained further below.

Conversion tank 198 has an agitator 198a with paddles 198b for keeping the solution well mixed, and the reaction product stream flows through a line 200 to a first screen 202. Liquid flows through a screen in first screen 202 into a tank 204 through a line 202a. Rubber flows from first screen 202 through a line 206 into a slurry tank 208, where the rubber is washed and then flows through a line 210 to a second screen 212. Serum flows through a screen into a tank 214 through a line 212a, and the serum is recycled through a line 214a.

Rubber product flows through a line 216 into an extruder 218 for extrusion and agglomeration. Rubber product flows through a line 220 to a conveyor 222 and into a hammer mill 224. The rubber product is then dried in a dryer 226 and conveyed with a conveyor 228 to a baler 230. Bales of rubber, typically weighing about 80 lbs but of any desirable weight, is weighed on a scale 232 and wrapped in a film by a film wrapper 234. Bales of rubber roll along a roller conveyor 236 and are boxed or crated in a box or crate 238. This rubber is a product according to the present invention as made by a process according to the present invention. This product, which may be referred to as black masterbatch with nanometric-sized fluffy carbon black particles, has desirable and superior characteristics that are described below and by example.

In the embodiment of the present invention described here, a carbon black plant and a rubber plant are located adjacent to one another and operate as an integrated carbon black-rubber plant. In another embodiment of the present invention a carbon black plant can be located from about one to hundreds of miles away from each other. A fluffy carbon black slurry can be formed according to the present invention and transported to a synthetic rubber plant. Fluffy carbon black slurry is very difficult to handle. Varying with its concentration, it is very viscous and abrasive. Before agitation, it is very viscous, but upon agitation, it is subject to shear thinning so viscosity decreases as flow rate increases.

One may convey fluffy carbon black in a fluidized state using a gaseous fluid rather than a liquid fluid. One may subsequently add a liquid such as water to make a slurry that is then added to the latex. Another alternative is to add the gaseous fluidized carbon black stream directly to the latex. As one embodiment, gaseous fluidized carbon black could be mixed together directly in a mixer of a suitable design with latex before the coagulation step. For example, fluffy carbon black could be transported to a rubber processing plant through a pneumatic conveyor line like line 52 in FIG. 1.

Transportation of fluffy carbon black slurry can be expensive, as well as difficult, particularly in a very dilute solution. While the density of a carbon black pellet may be about 0.35 grams per cubic centimeter (g/cc), the density of fluffy carbon black in a slurry may be as low as 0.05 g/cc. One may be able to transport a more concentrated slurry (for example, at about 50 weight percent carbon black in slurry) and dilute it prior to use (for example to about 10 weight percent carbon black in slurry). Tank trucks, rail cars and pipelines may be used to transport the fluffy carbon black slurry, but ongoing agitation (much like that in a truck that hauls ready-to-pour concrete) may be desirable. Additives may be available to lower the friction factor of the slurry for more efficient flow through a pipeline. In any case some consideration should be given to the flow and viscosity characteristics of the slurry and to its abrasiveness.

An existing carbon black plant can be modified or retrofitted to produce a fluffy carbon black slurry according to the present invention. The fluffy carbon black slurry can be transported by pipe, pipeline, tank truck or rail car to a synthetic rubber plant, and a black masterbatch can be made according to the present invention. With this modification or retrofit, the steps of pelletizing or agglomerating the carbon black, drying it, storing the pellets, packaging or bulk loading the pellets, transporting the pellets in bags or bulk, and receiving and handling the bagged or bulk pellets are all eliminated in the present invention. If the pellets were received by a tire or rubber product manufacturer, the pellets would have to be ground and compounded into rubber from a rubber plant, and these steps are eliminated in the present invention. Instead, in the present invention the fluffy carbon black slurry is delivered and mixed directly into the rubber as it is made to yield a black masterbatch that can be shipped to the tire or rubber product manufacturer ready to use. The tire or rubber product manufacturer receives the black masterbatch using the same facilities as used for receiving bales of rubber without carbon black.

If building a new facility, a tire or rubber product manufacturer does not need to invest in equipment and facilities for receiving, handling and grinding pellets of carbon black or in compounding equipment for mixing dry, ground carbon black with rubber. Even in an existing facility there are cost savings because the tire or rubber product manufacturer can idle the equipment and facilities for receiving, handling and grinding pellets and the compounding equipment. Idling this equipment would yield considerable savings in operating expenses, such as in energy and labor costs. Air pollution can also be reduced, and the expense of environmental facilities to control air pollution at the tire or rubber product manufacturer can be eliminated. Further, with the present invention, a tire or rubber product can be made with properties that are superior to those in a tire or rubber product made using carbon black that was first pelletized and then ground into small particles, presumably because the fluffy carbon black intermediate is used directly (in a slurry) without ever having been agglomerated or pelletized, which yields a significantly smaller carbon black particle in the final product and in which the carbon black is more uniformly dispersed than in the prior art.

Returning to FIG. 2B and the dispersing agent that may be added through line 164 to mixer 162, the dispersion can be done at ambient or at room temperature or between about 20 and about 80° C. Testing for optimization can be carried out by adding under stirring a dispersing agent derived from naphthalenesulfonic acid in a basic aqueous solution, preferably with a pH between 8 and 11. In one test, deionized water is used and pH is adjusted by means of an hydroxide of an alkaline-metal selected from potassium and sodium, preferably sodium hydroxide. The dispersing agent can be a metal-salt of polymerized naphthalenesulfonic acids, preferably using copolymers of sodium-formaldehyde naphthalenesulfonates. Preparation of a dispersing mixture can be carried out by heating to temperature within the range between 20 to 80° C. in order to obtain a fast and suitable dissolution.

For dispersion of fluffy carbon black, slow addition of fluffy carbon black to the dispersing and use of mixture mixing equipment is preferred. Preferably, in order to obtain a convenient viscosity, the dispersion may contain between 1 and 30% by weight of carbon black, to which the dispersing agent solution is added in such an amount that a dispersing agent/carbon black ratio of 1:50 to 1:200 by weight is reached, preferably about 1:100.

It is possible to use any mixing equipment to perform the fluffy carbon black dispersion stage, as long as foaming during mixing is avoided. Such equipment may be selected from stirring tanks, homogenization equipment, and equipment for the elaboration of carbon black agglomerates, such as binders. Avoiding making foam while stirring in a mixing equipment, mixing should continue long enough for the mixture obtained not to contain apparent crumbs when a sample is magnified up to 100 times.

The carbon black for the dispersion can be selected from any of several furnace types; and any of the carbon black known as 110, 220, 234, 299, 326, 330, 339, 347, 375, 530, 550, 583, 660, 680, 726, 770 and 774 can be used. Carbon blacks can also be selected from those known as Super Abrasion Furnace Carbon Black (SAF); Intermediate Super Abrasion Furnace Carbon Black (ISAF); Intermediate Super Abrasion Furnace Carbon Black of High Structure (ISAF-HS); High Abrasion Furnace Carbon Black (HAF); High Abrasion Furnace Carbon Black of High Structure (HAF-HS); Fast Extrusion Furnace Carbon Black (FEF); and Semi-reinforcement Furnace Carbon Black (SRF). In particular, carbon black 234, carbon black 550, intermediate super Abrasion Furnace Carbon Black (ISAF) and/or Fast Extrusion Furnace Carbon Black (FEF) can be used.

Once carbon black is incorporated, a crumb-free carbon black dispersion is obtained with a viscosity from 100 to 1000 cp having from 1 to 25% of suspended solids. The dispersion can allow rubber to be obtained that has improved mechanical properties when mixed with rubber emulsions before the recovery thereof since it practically eliminates crumbs formation. The dispersion degree of carbon black in rubber that can be obtained from the dispersion of carbon black of the present invention is higher than that obtained in prior art mixtures trough conventional equipment since in the case of the present invention, dispersion of particles is practically made individually, which consequently results in the disappearance of micro-voids that can cause poor performance in the materials.

In one embodiment of the present invention, a sufficient amount of solution to obtain a carbon black and rubber nano-dispersed material with 10 to 100 parts per hundred of rubber (phr) of carbon black is added. In those embodiments in which an extender oil is added, it is selected from highly aromatic type oils and naphthenic-type oils, and it is added in amounts enough to reach up to 100 phr. In the embodiment in which antioxidants are added, the antioxidants are added in amounts varying from 0.2 to 0.4 weight percent.

The rubber recovery process can be carried out from the mixture of carbon black with rubber emulsion through any method known therefor. As described above, recovery can be made through a coagulation process. Coagulation processes include, as unit operations, a rubber coagulates formation stage; a washing stage where coagulation agents residues are eliminated; a squeezing stage, and, a drying stage. Equipment is also available that groups some or all of the operations, and therefore the present invention can also be made through any method selected from a Coagulation-Washing-Drying (CWD) system in a single piece of equipment; in a welding (continuous coagulation-extrusion) system, using mechanical coagulation; and using static coagulation.

In general the rubber recovery process can be a rubber coagulation process wherein the step of crumbs formation is carried out at a temperature within the range from 50 to 100° C., preferably 80° C., in a coagulation tank using coagulating agents selected from metal salts and highly cationic polymers or copolymers in the presence of an acid medium. The salts can be selected from sodium chloride, calcium sulfate and aluminum sulfate. The polymers/copolymers include low molecular weight polyamines and/or polymers or copolymers derived from acrylic acid, in a sulfuric acid solution. The washing stage is made by contacting water with the obtained crumbs, where water is eliminated practically free of carbon black. Once the coagulation stage finishes, the washing stage is performed wherein coagulating agent residues are practically eliminated, which is followed by a squeezing stage with a kneader-type equipment and a drying stage of rubber squeezed through heating. The drying stage is carried out by heating to temperatures up to 60° C. and 180° C., preferably by using a furnace, until reaching a humidity content below 1%.

It is possible to obtain a wide variety of rubber compositions from the coagulation process of the present invention, since compositions with a high carbon black content can be obtained, a good distribution of the same in rubber and with large amounts of extender oil, which allows reducing costs of final products without affecting Theological and mechanical properties thereof. Such compositions, for the purposes of the present invention, are considered carbon black and rubber nano-dispersed materials. An amount of carbon black dispersion can be added to the rubber emulsion that allows obtaining from 10 to 100 phr of carbon black in the final composition, and an extender oil amount that allows obtaining from 10 to 100 phr in the final composition.

It has been found that when using large amounts of extender oil, the rubbers obtained do not exude and present adequate Theological properties for their processing. The carbon black is apparently of such small particle size and so well dispersed that one can attempt to mark on white paper with black masterbatch made according to the present invention, and the white paper will bear no discernable indication of the attempted marking.

Carbon black and rubber nano-dispersed materials in the form of master batches of vulcanized rubber with up to 100 phr of carbon black and with up to 100 phr of extender oil can be obtained without the material losing its Theological and mechanical properties, having a dispersion ASTM D2663-89 "A" ("Carbon Black Dispersion in Rubber", 1989) of at least 99%. Through the present invention, dispersions of at least 99% are obtained, which is highly significant, irrespective of the amount of carbon black incorporated into rubber.

The present invention can be used for different kinds of carbon black, as well as different kinds of rubber, which affects the magnitudes of the rheometric and mechanical properties for descriptive purposes. Rubbers obtained through the present invention, when parameters are identical, compared to a rubber with the same characteristics, where the only difference is whether the dispersion used is of a carbon black agglomerated form or a fluffy carbon black, show an increase in the Mooney viscosity of between about 2 and about 10%. Carbon black and rubber nano-dispersed materials such as vulcanized rubber compositions, show in turn between about 12 and about 40% increase in the maximum torque, and an increase between 15 and 80% in the modulus, depending on the kind of rubber and carbon black used, preserving the behavior known of the same properties when the type of rubber and the type of carbon black changes. This indicates that it is a material which has carbon black nanometrically dispersed, since harder materials could be obtained. This characteristic allows the incorporation of greater amounts of extender oil, through which mechanical properties can be adjusted according to the specific formulations needs.

By subjecting rubbers obtained through the present invention process to a vulcanization, optimal results in compositions are obtained. For applications in which material rheology is a must, for example in the tire industry, materials obtained through the present invention present great advantages, since the behavior of tan δ with respect to temperature is very advantageous. Materials obtained by the present invention show an increase in the tan δ value at 0° C. with respect to prior art materials, while they present a reduction in the same parameter at 60 and 80° C.

More specifically, in prior art materials the difference between the tan δ value at 0° C. and tan δ value at 60° C. is found to be between about 0.03 and about 0.09, while with those materials obtained through the present invention, differences from about 0.06 up to about 0.2 can be obtained which means that a material will have a better performance at high and low temperatures for tire applications. In one embodiment of the present invention, the increase in tan δ at 0° C. of materials of the present invention compared to those of the prior art could be up to approximately 35%, while the reduction of tan δ at 60° C. could be up to about 50%.

Turning now to the distinctions between using fluffy carbon black according to the present invention to make carbon-filled rubber and agglomerated or pelletized carbon black to make carbon-filled rubber, the particle size distribution of a typical sample of fluffy carbon black is compared to the particle size distribution obtained by grinding pellets of carbon black. In an experiment to compare the two types of carbon black, pellets of N-234 type carbon black were ground as finely as is practical for a manufacturing operation, which will be referred to here as "ground pellet." Fluffy N-234 type carbon black, which had not been agglomerated or pelletized, was obtained for comparison and will be referred to here as "fluffy carbon black."

To measure the particle size distribution, a laser light scattering instrument was used, which is available from Horiba Ltd. of Kyoto, Japan. The Horiba Model LA-910 was used with a helium-neon laser detector model GLT2331 at a wave length of 632.8 nm. A sample of each of the carbon blacks, ground pellet and fluffy carbon black, were dispersed in 150 ml of water, until reaching a concentration proportional to 80% transmittance, as measured in the Horiba Model LA-910. Ultrasonic mixing and recirculation was applied constantly during the run for dispersing the carbon black in the water. A refraction index of 1.88 was maintained with respect to water, the determination was taken over three minutes at room temperature. The results of the measurements are presented in Table 1 below, and a frequency distribution of the measured particle sizes is provided in FIG. 3.

TABLE 1

| Fluffy Carbon Black | | Ground Pellet | |
|---|---|---|---|
| Size (microns) | Freq. (%) | Size (microns) | Freq. (%) |
| | | 6.720 | 0.18 |
| | | 5.867 | 0.33 |
| | | 5.122 | 0.53 |
| | | 4.472 | 0.80 |
| | | 3.905 | 1.12 |
| | | 3.409 | 1.41 |
| | | 2.976 | 1.60 |
| | | 2.599 | 1.75 |
| | | 2.269 | 1.80 |
| | | 1.981 | 1.83 |
| 1.729 | 0.10 | 1.729 | 1.75 |
| 1.510 | 0.20 | 1.510 | 1.58 |
| 1.318 | 0.41 | 1.318 | 1.61 |
| 1.151 | 0.92 | 1.151 | 2.07 |
| 1.005 | 1.56 | 1.005 | 2.11 |
| 0.877 | 2.44 | 0.877 | 2.20 |
| 0.766 | 3.53 | 0.766 | 2.40 |
| 0.669 | 4.99 | 0.669 | 2.85 |
| 0.584 | 7.17 | 0.584 | 3.82 |
| 0.510 | 9.89 | 0.510 | 5.42 |
| 0.445 | 12.31 | 0.445 | 7.49 |
| 0.389 | 13.87 | 0.389 | 9.93 |
| 0.339 | 13.58 | 0.339 | 11.73 |
| 0.296 | 11.29 | 0.296 | 11.62 |
| 0.259 | 7.89 | 0.259 | 9.31 |
| 0.226 | 4.65 | 0.226 | 5.99 |
| 0.197 | 2.46 | 0.197 | 3.28 |
| 0.172 | 1.27 | 0.172 | 1.70 |
| 0.150 | 0.69 | 0.150 | 0.88 |
| 0.131 | 0.39 | 0.131 | 0.48 |
| 0.115 | 0.24 | 0.115 | 0.27 |
| 0.100 | 0.15 | 0.100 | 0.16 |

Figure 3:
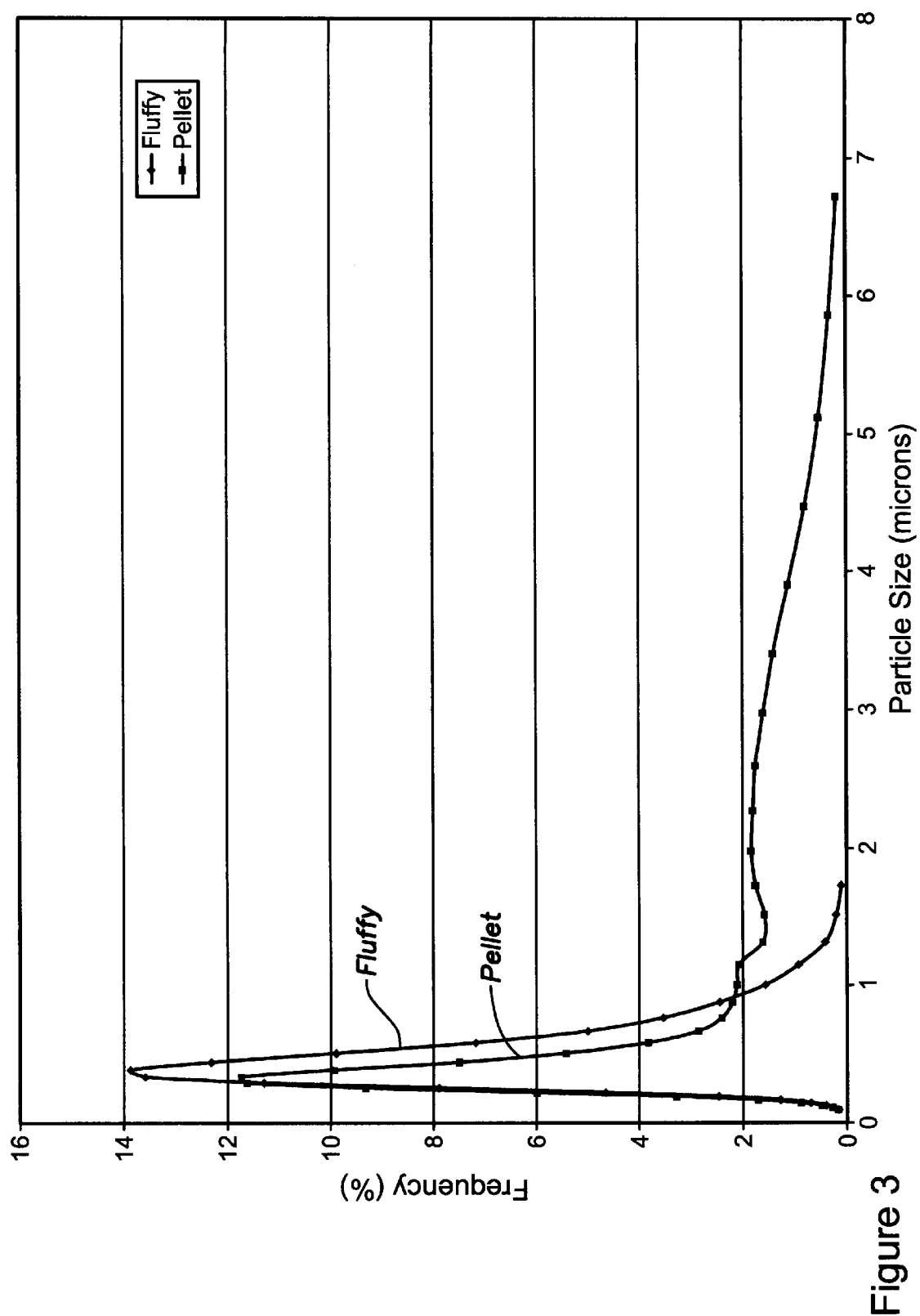
FIG. 3 is a graph showing the distribution of particle sizes of fluffy carbon black as compared to carbon black obtained by grinding pellets of carbon black.

Analyzing FIG. 3, it can be seen that the particle size distribution obtained when pellets are ground overlaps the particle size distribution of fluffy carbon black, but the ground pellets have a substantial portion of its particles that are larger than the largest particles in the fluffy carbon black. The particle size distribution of the fluffy carbon black dispersed in water ranges from about 100 to about 1700 nanometers with only about 1.63% of the particles having a size greater than 1.005 microns (or micrometers), which is about 1000 nanometers (nm). All of the fluffy carbon black particles dispersed in water are less than two microns in size, with the largest size measurement being 1729 nanometers (about 1.7 microns). About 95% of the fluffy particles have a size less than about 900 nm. It is believed that generally about 99% of the carbon black particles in rubber made according to the present invention will be less than about 2 microns, and about 95% will be less than about 1 micron.

The ground pellet on the other hand has a size distribution ranging from about 100 to about 6700 nanometers. About 18.36% of the ground pellet carbon black particles have a size greater than about 1.005 microns, which is about 1000 nanometers. Further, about 11.35% of the ground pellet carbon black particles are larger than the largest fluffy carbon black particle dispersed in water in this experiment, and about 9.5% of the particles from the ground pellets have a size greater than about 2000 nm. About 95% of the ground particles have a size less than about 3500 nm. About 90.5% of the ground particles have a size less than about 2 microns, and about 79.5% of the ground particles have a size less than about 1 micron.

In this experiment the weighted average particle size of fluffy carbon black dispersed in water is about 0.44 microns, while the weighted average particle size of ground pellet carbon black is about 0.78 microns. As is apparent from looking at FIG. 3, the particle size distribution of fluffy carbon black is nearly a normal bell-shaped curve while the particle size distribution of ground pellets of carbon black is positively skewed. It is believed that this particle size distribution is representative of the distribution in carbon-filled rubber. Thus, the particle size distribution of carbon black in carbon-filled rubber made according to the present invention is not skewed significantly and has a weighted average particle size of less than about 700 nm, preferably less than about 600 nm and more preferably less than about 500 nm.

While the results of one experiment have been provided, it is believed that the fluffy carbon black according to the present invention has an average particle size ranging between about 400 nm and about 800 nm, typically an average size between about 500 and about 700 nm, and the fluffy particle size ranges in its distribution from about 100 nm to about 2000 nm or at least about 95% of the particles are less than about 2000 nm when measured as dispersed in water. This is in contrast to pelletized or agglomerated carbon black that has been subsequently ground by mechanical means to obtain as small a particle size as possible, where the particle size of such ground carbon black has an average particle size between about 1000 nm and about 3000 nm, typically an average size of about 2000 nm or about 2 microns and a range in particle size between about 0.1 microns (100 nm) and about 7 microns (7000 nm).

Consequently, the weighted average particle size of the fluffy carbon black intermediate of the present invention is roughly half (about 50 to about 70%) that of ground carbon black obtained by pulverizing carbon black pellets. The distribution of particle sizes obtained from pulverizing carbon black pellets may overlap the distribution of particle sizes of fluffy carbon black intermediate, but it is believed that the generally smaller particle size of the fluffy carbon black intermediate contributes to improvements in properties obtained in rubber-carbon black products made according to the present invention. It is believed that the carbon black particles from ground pellets that are larger than the largest particles in fluffy carbon black have a detrimental effect on rubber properties as compared to rubber made according to the present invention.

Without being held to theory, the particle size of carbon black, as measured in the experiment above where the carbon black was dispersed in water, may not provide a full explanation of the improvements obtained in the properties of carbon-filled rubber made by incorporating fluffy carbon into rubber latex before or during the coagulation step. Fluffy carbon black tends to agglomerate naturally, particularly in water, so the particle size measured in the experiment above may not be fully indicative of the particle size distribution obtained when fluffy carbon black is incorporated into rubber according to the present invention. Photographs of carbon-filled rubber product taken using transmission electron microscopy (TEM), which are discussed below, may provide a better indication of the results that can be achieved with the present invention.

Rubber and polymeric materials made with nanometric-sized carbon filler have improved rheological and mechanical properties as compared to rubber and polymeric materials made with micron-sized carbon filler. The process for the preparation of carbon black and rubber nano-dispersed materials of the present invention, as well as advantages rendered to products obtained therefrom, will be more clearly illustrated by the following examples, which are presented for illustrative purposes only and therefore are not intended to limit the scope of this invention.

EXAMPLES 1–14

Process for the Preparation of a Carbon Black Suspension

Dispersions with 40 g of water and 10 g of fluffy carbon black N-234 type manufactured by Cabot Corporation were carried out. The fluffy carbon black was first placed in water, and a solution of a dispersing agent with a basic aqueous solution of 16% sodium hydroxide with a pH of 10 was added.

Dispersions were carried out with several dispersing agents and the amount required to disperse 10 g of carbon black above mentioned, was scored. The following dispersing agents were tested: hydrophilic block copolymer, which is available under the U.S. trademark Hydropalat® 3275, for example 1 (E1); alkylene oxide block copolymer, which is available under the U.S. trademark Hydropalat® 1080 for example 2 (E2); octadecyl sulfosuccinamate available, which is available under the U.S. trademark Meximul® 991 for example 3 (E3); tetrasodium sulfosuccinamate tricarboxilate, which is available under the U.S. trademark Meximul® 346 for example 4 (E4); sulfated alkyl-aryl ether, which is available under the U.S. trademark Meximul® P-607 for example 5 (E5); sodium dioctyl sulfosuccinamate, which is available under the U.S. trademark Meximul® 712 for example 6 (E6); polyacrylic acid, which is available under the U.S. trademark Diper® 1227 for example 7 (E7); tetrasodium N-(1,2-dicarboxyethyl)-N-octadecyl sulfosuccinamate, which is available under the U.S. trademark Aerosol® 22 for example 8 (E8); sodium bis(tridecyl) sulfosuccinate, which is available under the U.S. trademark Aerosol® TR-70 for example 9 (E9); a mixture of sodium bis(tridecyl) sulfosuccinate with ethyl hexanol, which is available under the U.S. trademark Aerosol® OT-NV for example 10 (E10); an etoxilated octadecylamine-octadecylguanidine complex, which is available under the U.S. trademark Aerosol® C-61 for example 11 (E11); monoester phosphate, which is available under the U.S. trademark Surfacpol® 9010 for example 12 (E12); diester phosphate, which is available under the U.S. trademark Surfacpol® 9030 for example 13 (E13); and sodium naphthalenesulfonate polymer with formaldehyde, which is sold under the U.S. trademarks Criosotan® and Daxad® for example 14 (E14). Results are shown in Table 2.

TABLE 2

| Example | Dispersing Agent | Concentration | Required amount for dispersing (ml) | PERFORMANCE |
|---|---|---|---|---|
| E1 | hydrophilic block copolymers | 16% | 10 | Grumous |
| E2 | alkylene oxide block copolymer | 16% | 8 | Good |
| E3 | octadecyl sulfosuccinamate | 16% | 17 | Slightly Grumous |
| E4 | tetrasodium sulfosuccinamate tricarboxilate | 16% | 8.5 | Grumous, Sediments |
| E5 | sulfated alkyl-aryl ether | 16% | 5.5 | Sediments |
| E6 | sodium dioctyl sulfosuccinamate | 16% | 13 | Sediments, Grumous |
| E7 | polyacrylic acid | 16% | 16 | Sediments |
| E8 | tetrasodium N-(1,2-dicarboxyethyl)-N-octadecyl sulfosuccinamate | 16% | 15 | Slightly Grumous |
| E9 | sodium bis(tridecyl) sulfosuccinate | 16% | 30 | 2 Phases |
| E10 | mixture of sodium bis(tridecyl) sulfosuccinate with ethyl hexanol | 16% | 15 | Sediments, Grumous |
| E11 | etoxilated octadecylamine-octadecylguanidine complex | 16% | 23 | Good |
| E12 | monoester phosphate | 16% | 5 | Slightly Grumous, Foaming |
| E13 | diester phosphate | 16% | 5 | Few Crumbs Formation |
| E14 | sodium naphthalenesulfonate polymer with formaldehyde | 16% | 8.5 | Good |

With reference to Table 2, an indication of grit sediments or phase separation will indicate a low efficiency dispersion process, and this will be noted by a grumous (or lumpy) appearance. The smaller the agglomerates or particles are, the more stable the dispersion. It is desirable to achieve an excellent dispersion of the fluffy particles (in the slurry) in such a way that the agglomerates are kept as small as possible. In the process described above for making the black masterbatch rubber according to the present invention, the fluffy carbon black slurry should be mixed intimately with the latex emulsion. A good dispersion of the fluffy carbon black in the slurry will increase the contact between the rubber and the fluffy particles, increasing the possible interactions among them. The dispersion should be maintained during the coagulation stage.

Several ways are used to determine stability in dispersions, which are discussed, for example, in HLB (Hydrophilic Lypophilic Balance) System by ICI Americas Inc., Wilmington, Del., 1987. Some of the tests include: (phase) separation of the ingredients maybe in a few minutes or after a night and separation after freeze-thaw cycles. Emulsifying criteria can be determined by observing clarity or viscosity. Here, stability was evaluated by observing the material appearance after standing overnight.

As can be seen in Table 2, the best results for dispersing carbon black in water to form a slurry were obtained using as dispersing agents of the family of alkylene block copolymers, octadecyl sulfosuccinamate, etoxilated octadecylamine-octadecylguanidine complex, monoester and diester phosphates and sodium naphthalenesulfonate polymer with formaldehyde. However, only naphthalenesulfonates maintained good performance when mixed with rubber emulsions, as shown in the following examples 15 to 28.

EXAMPLES 15–28

Coagulation Process

Several requirements are preferably met in the coagulation process. Among them, it is desired to use the least amount of coagulants (brine and acid) for cost and disposal reasons. Also, a totally clear serum should be obtained to avoid environmental and further recovery problems while increasing the yield of the process at the same time. Here several parameters are to be evaluated, including: a) size of the agglomerate; b) ease of squeezing; and c) clear water. The size of the agglomerate is important because if a very fine size is obtained there will be problems recovering the material, and a big lump should to be avoided because it can be trapped along the process and plug the system. As for squeezing, the agglomerate should not trap water because problems will arise during the squeezing and drying processes if this occurs. With regard to clear water, after coagulation, the remaining water or serum should be totally clear (not turbid), indicating a good coagulation process. All of these parameters were evaluated in order to qualify an experiment with a good grade.

Dispersions obtained from examples 1 to 14 were subjected to a coagulation process at room temperature, followed by the addition of a brine solution [6% by weight of NaCl] and a 1.0 N sulfuric acid solution. The amount of brine was three (3) times relative to the dispersion to coagulate and a 10% by weight of the acid solution. The dispersion to coagulate is composed of: water, latex particles and fluffy carbon black. If the coagulate is one part (take 100 gr as a basis) then the brine solution are added to coagulate is three parts (300 gr). The required amount of sulfuric acid (1 N) is 10% of the dispersion to be coagulated (i.e., 10 gr). The results obtained are shown in Table 3.

TABLE 3

| | Dispersion Obtained From | Dispersing Agent | PERFORMANCE |
|---|---|---|---|
| E15 | E1 | hydrophilic block copolymers | Grumous, Sediments, No Agglutination |
| E16 | E2 | alkylene oxide block copolymer | Good, Slightly Grumous |
| E17 | E3 | octadecyl sulfosuccinamate | Few Crumbs Formation |
| E18 | E4 | tetrasodium sulfosuccinamate tricarboxilate | Few Crumbs Formation, Sediments |
| E19 | E5 | sulfated alkyl-aryl ether | Sediments, Good |
| E20 | E6 | sodium dioctyl sulfosuccinamate | Sediments, Few Crumbs Formation |
| E21 | E7 | polyacrylic acid | Good, Sediments + |
| E22 | E8 | tetrasodium N-(1,2-dicarboxyethyl)-N-octadecyl sulfosuccinamate | Few Crumbs Formation |
| E23 | E9 | sodium bis(tridecyl) sulfosuccinate | Few Crumbs Formation |
| E24 | E10 | mixture of sodium bis(tridecyl) sulfosuccinate with ethyl hexanol | Sediments, Few Crumbs Formation |
| E25 | E11 | etoxilated octadecylamine-octadecylguanidine complex | Not Coagulated, Few Crumbs Formation |
| E26 | E12 | monoester phosphate | Slightly Grumous, Foaming |
| E27 | E13 | diester phosphate | Slightly Grumous, Good |
| E28 | E14 | sodium naphthalenesulfonate polymer with formaldehyde | Good |

From the results shown in Table 3, it can be concluded that the dispersing or surfactant agents that gave better results when coagulating fluffy carbon black in water were the alkylene oxide block copolymer sold under the U.S. trademark Hydropalat® 1080, the sulfated alkyl-aryl ether, the polyacrylic acid (Diper® 1227), and the naphthalenesulfonate (sold under U.S. trademarks Criosotan® and Daxad®). However, coagulating the Hydropalat® 1080 alkylene oxide block copolymer and Diper® 1127 polyacrylic acid presented some problems, from which it was concluded that the Criosotan® and Daxad® naphthalenesulfonates are the dispersing agents that provide the best results. Various naphthalenesulfonate solutions are believed to be useful, including salts other than sodium naphthalenesulfonate and solvents other than formaldehyde.

EXAMPLES 29–31

Comparison of Dispersions Obtained Through Different Carbon Black Incorporation Processes The fluffy carbon black dispersion from example 14, which was dispersed using sodium naphthalenesulfonate polymer with formaldehyde, was mixed in a stirring tank in a sufficient amount to yield 50 phr of carbon black in SBR 1502 rubber with 50 phr of ASTM 2226-82 extender oil (as defined in "Description for Petroleum Extender Oils Types", 1982), which was vulcanized to obtain a formulation with 2 phr of stearic acid (accelerator activator), 1 phr of Rubatan BF(phosphite used as antidegradant), 4 phr of zinc oxide (used as an activator), 1.5 phr of Vulkanox Pan (benzothiazole used as an accelerator); 1.5 phr of Rubenamid C (amine used as an antidegradant agent) and 1.8 phr of sulfur (used as the vulcanizing agent).

EXAMPLE 29

A rubber coagulation process was performed wherein 1500 ml of fluffy carbon black dispersion from example 14 was added under stirring to 1085 g of a rubber emulsion with 20% of suspended solids, along with the high aromatic extender oil and butyl hydroxy toluene (BHT) as antioxidant. Afterwards, the mixture was coagulated using 3 liters of a sodium chloride solution with 1.037 g/cc density and 20 ml of 0.1 N sulfuric acid solution. When the coagulation ended, the coagulate was washed, squeezed, and dried out at 50° C. for 24 hours. To the rubber obtained, 1.75 phr of sulfur, 3 phr of zinc oxide, 1 phr of stearic acid, and 1.5 phr of n-tertiaryl-butyl-benzothiazole (TBBS) sulfonamide were added and were ground in a roll mill to proceed with vulcanization.

Figure 4:
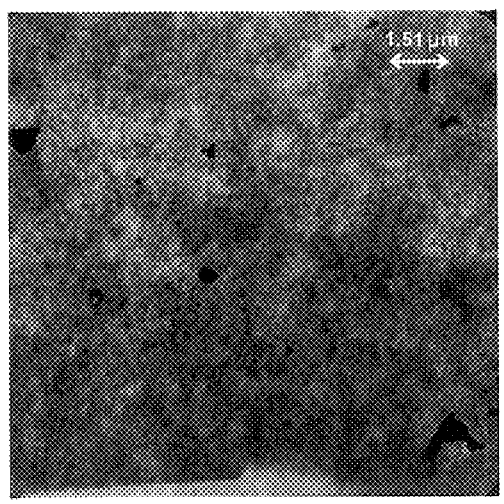
FIG. 4 is microphotograph of a carbon-filled rubber made according to the present invention, magnified 8000 times.

FIG. 4 shows a microphotograph of the inventive material at 8,000 times amplification. The microphotograph was obtained using transmission electron microscopy. A highly homogeneous dispersion is desired, which is indicated by a gray tone. A less homogeneous dispersion is indicated by discrete black and white spots, such as observed in FIG. 5. A black spot is carbon black, and a white spot is rubber without carbon black filler. A gray homogeneous tone indicates a highly homogeneous dispersion, which indicates better mechanical properties than where there are larger discrete particles of carbon black.

The distance between the tips of the arrows shown in FIG. 4 represents 1.51 microns or micrometers ($\mu m$) in the carbon-filled rubber sample of Example 29. As can be appreciated from studying the microphotograph of FIG. 4, none of the carbon black particles in the inventive material have a diameter larger than 1.5 microns, and only seven (7) defined or discrete particles of carbon black (the black spots) can be readily observed, which were not dispersed, and which represent together less than 1% of the 100 squared micron area in the microphotograph.

A standard method provided by the American Society of Testing and Materials (ASTM) known as method ASTM D2663A is used to study the degree of dispersion of carbon black in rubber using an optical surface analysis. The surface of a carbon black compound can be viewed with a microscope or video system, and the roughness of the surface ranked on a scale of 1 to 5 (ASTM D2663, Method A) or some other scale. To get a more absolute measurement as opposed to a relative measurement, standards can be prepared and quantified by a more absolute method, such as transmission electron microscopy.

In order to get a representative surface to view, a specimen should be cut (or fractured) with a very sharp blade. A fresh razor blade works well for samples of rubber, and the blade should be used only once. The blade will not cut the carbon black particles, but rather will pull them out of the matrix. Thus the surface is covered with hills and valleys the size of the particles. An instrument called a Dispersegrader provides measurements according to Method A of ASTM D2663. In this method the surface is imaged with a video camera and compared side by side to standards stored in memory. The material obtained in example 29 showed a 99% ASTM D2663A dispersion as measured with the Dispersegrader.

EXAMPLE 30

Figure 5:
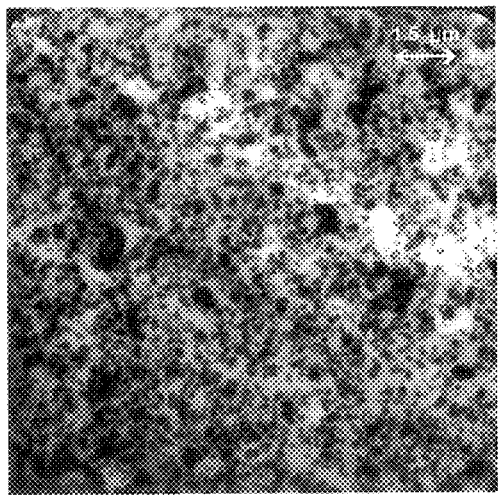
FIG. 5 is a microphotograph of a carbon-filled rubber obtained through a process of incorporating carbon black in rubber from an aqueous dispersion of ground carbon black pellets, magnified 8000 times.
Figure 6:
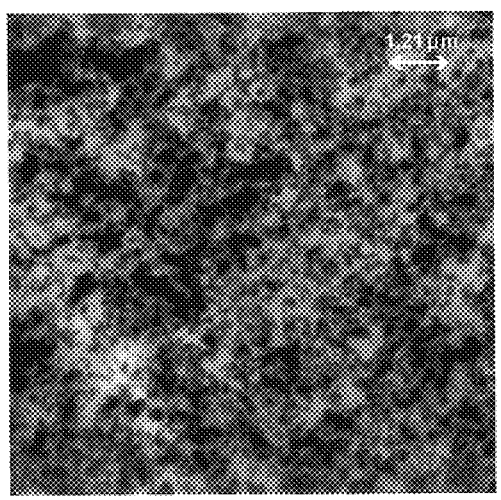
FIG. 6 is a microphotograph of a carbon-filled rubber obtained through a process of incorporating carbon black in rubber from an aqueous dispersion of ground carbon black pellets, magnified 10000 times.

A coagulation was performed with the same parameters as for example 14 but using carbon black pellets instead of fluffy carbon black. FIG. 5 shows a photograph of the obtained material with a 8,000 times amplification, while FIG. 6 shows an 10,000 times amplification, both obtained by transmission electron microscopy. The distance between the tips of the arrows in FIG. 5 represents 1.5 microns in the carbon-filled rubber sample while in FIG. 6 it is 1.21 microns. A significant amount of non-dispersed particles can be observed in the microphotographs of FIGS. 5 and 6. In this case, ASTM D2663 "A" dispersion was 96% for this carbon black obtained by grinding carbon black pellets as compared to a 99% dispersion obtained using fluffy carbon black in Example 29.

EXAMPLE 31.

A coagulation process with the same parameters as example 14, but using ground carbon black pellets instead of fluffy carbon black, was carried out, and adding the ground carbon pellets during a mixing stage of agents for their vulcanization after coagulation, which is known as a dry mechanical mixture.

Figure 7:
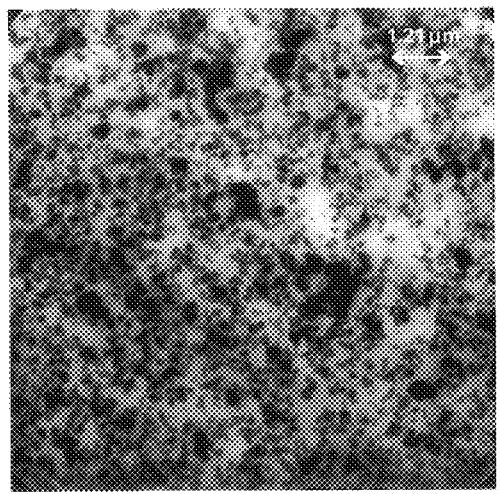
FIG. 7 is a microphotograph of a carbon-filled rubber obtained through a process of incorporating carbon black in rubber from ground carbon black pellets using dry mechanical mixing, magnified 10000 times.

FIG. 7 shows a photograph of the obtained material with a 10,000 times amplification obtained through transmission electron microscopy, which has an ASTM D2663 "A" dispersion of 96%. The distance between the tips of the arrows represents 1.21 microns in the actual sample. Although the rubber obtained has the same ASTM dispersion as that of example 16, it is evident that microphotographs show a greater amount of crumbs when compared to FIG. 6.

According to the results obtained from examples 29 to 31, the superiority of dispersion obtained is evident through the method of the present invention, which minimizes microvoids formation within crumbs, which results in better mechanical properties.

EXAMPLES 32–37

Carbon Black Amount Effect

It is known that in some cases, even poorer carbon black dispersions are obtained, when the amount thereof is reduced, which further impacts on mechanical properties. For this reason, the process of example 29 was performed by using: 30 phr, 50 phr and 70 phr of fluffy carbon black, respectively, for examples 32 to 34; while for the examples 35 to 37, 30 phr, 50 phr and 70 phr of agglomerated carbon black in the form of pellets were used. Referring to extender oil, 13 phr were used.

The results obtained can be seen in Table 4.

TABLE 4

| EXAMPLE | E32 | E33 | E34 | E35 | E36 | E37 |
| --- | --- | --- | --- | --- | --- | --- |
| Type of Carbon Black | Fluffy | Fluffy | Fluffy | Pellet | Pellet | Pellet |
| Amount of Carbon Black, phr | 30 | 50 | 70 | 30 | 50 | 70 |
| ASTM D2663 "A" | 99% | 99% | 99% | 91% | 96% | 96% |

It is evident that in the case of the present invention, optimum dispersions are obtained independently of the amount of carbon black integrated into rubber, while in the case of mixtures made from agglomerated carbon black, dispersion is effected by the amount of carbon black incorporated, besides being inferior to that obtained with the present invention.

EXAMPLES 38–43

Mechanical Properties

With the process described for example 15, different SBR rubber formulations were prepared in order to evaluate Mooney viscosity at 100° C., elastic shear modulus; maximum torque and modulus at a determined deformation.

Formulations used for each example are shown in Table 5.

TABLE 5

|  | E38 | E39 | E40 | E41 | E42 | E43 |
| --- | --- | --- | --- | --- | --- | --- |
| TYPE OF SBR RUBBER | 1712 | 1712 | 1502 | 1502 | 1502 | 1502 |
| CARBON BLACK TYPE | 550 | 550 | 550 | 550 | 234 | 234 |
| CARBON BLACK FORM | pellet | fluffy | pellet | fluffy | pellet | fluffy |
| CARBON BLACK (phr) | 55 | 55 | 50 | 50 | 50 | 50 |
| EXTENDER OIL (phr) | 0 | 0 | 0 | 0 | 12.5 | 12.5 |
| ZnO (phr) | 3 | 3 | 3 | 3 | 3 | 3 |
| Stearic acid (phr) | 1 | 1 | 1 | 1 | 1 | 1 |
| TBBS (phr) | 1.5 | 1.5 | 1.5 | 1.5 | 1.5 | 1.5 |
| Sulfur (phr) | 1.75 | 1.75 | 1.75 | 1.75 | 1.75 | 1.75 |

The results obtained from evaluating the different formulations shown in Table 5 are provided in Table 6.

TABLE 6

| TEST | E38 | E39 | E40 | E41 | E42 | E43 |
|---|---|---|---|---|---|---|
| M100 | 116 | 125 | 82.6 | 104 | 67.7 | 69.1 |
| MOD ST | 2X104-2X105 | 2X104-2X105 | 1X106-1X107 | 1X107-1X108 | 1X104-1X105 | 5X107-5X108 |
| MAX TOR | 13.85 | 15.51 | 14.57 | 20.4 | 11.07 | 13.32 |
| MOD at DEF | 12.04 | 13.92 | 9.4 | 16.8 | 9.32 | 14.07 |

M100 = Mooney viscosity at 100° C. without vulcanizing
ST MOD = Storage Modulus
MAX TOR = Maximum torque
DEF MOD = Modulus at 300% deformation (EXAMPLES 38, 39, 42 and 43) or at 200% deformation (EXAMPLES 40 and 41)

It is apparent from the results obtained in Table 6 that an improvement is obtained practically in all cases that used fluffy carbon black for all mechanical properties when comparing a process in which agglomerated carbon black is used with one using fluffy carbon black. These results further confirm what is appreciated from FIGS. 4 to 7 with regard to the incorporation of carbon black in the rubber.

The Mooney viscosity (M100) in Table 6 shows higher values for the samples containing fluffy. It is well known when preparing rubber compounds that when the reinforcer (in this case the fluffy) is acting (Zhu, A. and S. Sternstein, "Filled and Nanocomposite Polymer Materials", Mater. Res. Soc. Proc. 2001), there is a good interaction between the rubber and the carbon black, therefore a higher Mooney viscosity is obtained. The same is observed in storage modulus which can be raised by increasing the amount of an interacting filler or by adding a more interacting filler. This last feature is achieved in the examples where fluffy is used instead of ground pellets of carbon black. This also adds an economical advantage given that the carbon black is more expensive than the rubber, and therefore, the same performance can be obtained with less reinforcement. This higher interaction is also corroborated with the Modulus @ 300% elongation where a greater force is required to elongate the materials containing fluffy, compared with the ground carbon black pellet. This also implies a higher grip between the fluffy and the rubber. This could be due to a higher surface area (which we believe) or to a more reactive carbon black with the same surface area or both. We believe that the material of this invention has a much better dispersion (smaller particle size) as is shown in the TEM micrographs.

EXAMPLES 44–49

Tan δ Value Behavior

One of the most important parameters for applications of rubber for tires is the tan δ value, which relates the elastic and viscous modulus of materials. At low temperatures, this parameter is desired to be larger, and at high temperatures, the same is desired to be as small as possible.

It is generally accepted (for example, see Dynamic Mechanical Analysis; Kevin P. Menard; CRC Press) that the tan delta values taken at different temperatures can be correlated with the tire performance. For instance a high value of tan delta at around −30° C. is correlated with better ice traction properties, meaning a good grip at very low temperatures, and a high value of tan delta at about 0° C. is correlated with better wet traction properties (not sliding during rainy conditions). A low value of tan delta at about 60° C. is correlated with good rolling resistance, which increases the life of a tire and reduces fuel consumption. All of these tire performance requirements are achieved with a product made according to the present invention.

In order to evaluate the tan δ behavior of the materials obtained by the present invention, examples 44 to 49 were carried out wherein SBR 1502 rubber was used for examples 44, 45, 47 and 48, and SBR 1712 rubber for examples 46 and 49. Fifty (50) phr carbon black was used for examples 44, 46, 47, 49, and examples 45 and 48 used thirty (30) phr of carbon black. The remaining components were in the amounts used for example 15. It is important to further mention that examples 44 to 46 were carried out through the process of the present invention, i.e., using fluffy carbon black, while examples 47 to 49 were performed by using agglomerated carbon black in pellet form and mechanically dry mixed after rubber recovery.

The results obtained when evaluating tan δ at 0, 60 and 80° C. at a 0.05% deformation and at 16 Hz with a torque instrument are shown for each example in Table 7. ASTM D 5418 for dynamic mechanical analysis in dual cantilever was used to obtain the results in Table 7.

TABLE 7

| Example | E44 | E45 | E46 | E47 | E48 | E49 |
|---|---|---|---|---|---|---|
| Type of CB | Fluffy | Fluffy | Fluffy | Pellet | Pellet | Pellet |
| Carbon Black | 50 phr | 30 phr | 50 phr | 50 phr | 30 phr | 50 phr |
| Rubber | SBR 1502 | SBR 1502 | SBR 1712 | SBR 1502 | SBR 1502 | SBR 1712 |
| Tan δ @ 0° C. | 0.2889 | 0.2470 | 0.2250 | 0.2136 | 0.2113 | 0.2038 |
| Tan δ @ 60° C. | 0.0916 | 0.1328 | 0.1233 | 0.1695 | 0.1852 | 0.1653 |
| Tan δ @ 80° C. | 0.0718 | 0.1129 | 0.1002 | 0.1602 | 0.1783 | 0.1549 |
| Ratio of Tan δ at 0° C. to Tan δ at 80° C. | 4.02 | 2.19 | 2.25 | 1.33 | 1.19 | 1.32 |

From Table 7, it is possible to appreciate that in the examples in which fluffy carbon black was used, at high temperatures, a smaller tan δ than its equivalent with agglomerated carbon black mechanically mixed after the rubber recovery was obtained, while at low temperatures a significant tan δ increase is achieved in the material manufactured with the process of the present invention using fluffy carbon black, in respect to its equivalent with agglomerated carbon black dry mixed after rubber recovery.

A ratio has been calculated and presented in Table 7, which is the ratio of tan δ at 0° C. to tan δ at 80° C. Since it is desirable to have a high tan δ at low temperatures and a low tan δ at high temperatures and since it is desirable to have both a high tan δ at low temperatures and a low tan δ at high temperatures, a ratio of tan δ at 0° C. to tan δ at 80° C. is indicative of the performance of a carbon-filled rubber exceeding about 2.0 and more preferably exceeding about 3.0.

Figure 8:
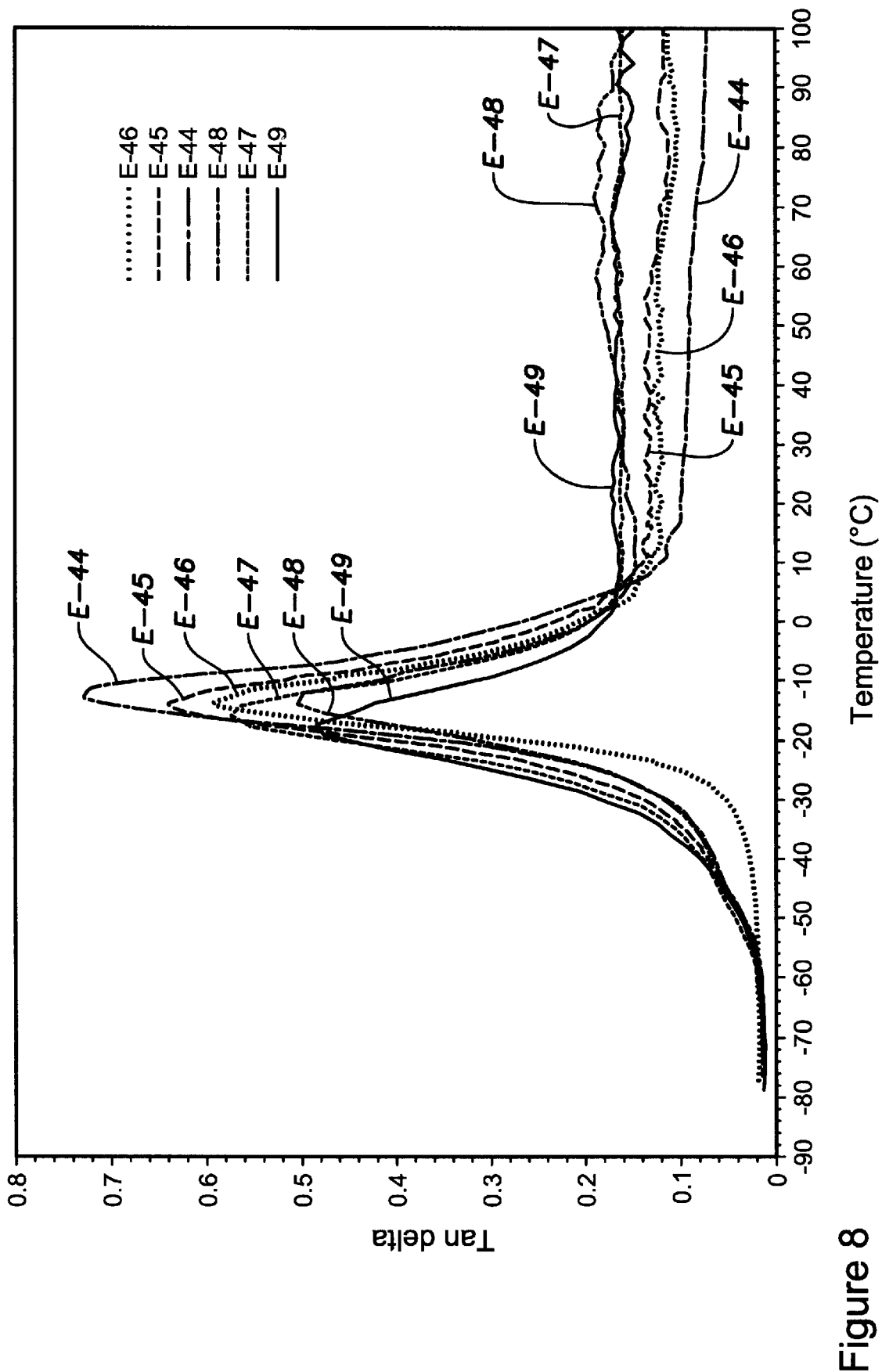
FIG. 8 is a graph showing the behavior of tan δ with respect to temperature of vulcanized rubber to which carbon black was incorporated through the process of the present invention compared with rubber obtained from dry mechanical mixing or compounding of ground carbon black pellets into rubber.

Further evidence of improvements in tan δ is provided by data in Table 8. For each example in Table 8, a curve is plotted in FIG. 8 of tan δ curves versus temperature. These graphs confirm the behavior discussed in the above paragraph.

TABLE 8

| E-44 | | E-45 | | E-46 | | E-47 | | E-48 | | E-49 | |
|---|---|---|---|---|---|---|---|---|---|---|---|
| Temp. °C. | Tan delta | Temp. °C. | Tan delta | Temp. °C. | Tan delta | Temp. °C. | Tan delta | Temp. °C. | Tan delta | Temp. °C. | Tan delta |
| −72.788 | 0.013 | −76.432 | 0.0147 | −77.168 | 0.0188 | −72.476 | 0.0151 | −74.064 | 0.0143 | −78.696 | 0.013 |
| −70.764 | 0.0131 | −70.544 | 0.0138 | −70.452 | 0.0177 | −70.176 | 0.0158 | −70.568 | 0.0139 | −69.588 | 0.0123 |
| −65.52 | 0.014 | −65.484 | 0.0154 | −65.668 | 0.018 | −66.312 | 0.0158 | −64.772 | 0.0148 | −65.816 | 0.0133 |
| −60 | 0.0151 | −60.332 | 0.0177 | −60.24 | 0.0193 | −59.78 | 0.0207 | −60.908 | 0.0171 | −60.02 | 0.017 |
| −54.296 | 0.0217 | −55.18 | 0.0244 | −55.548 | 0.0198 | −55.364 | 0.0264 | −55.02 | 0.0233 | −54.776 | 0.0246 |
| −50.34 | 0.0326 | −50.212 | 0.0354 | −50.856 | 0.0202 | −49.568 | 0.0442 | −49.224 | 0.0375 | −50.912 | 0.0341 |
| −44.728 | 0.0517 | −45.796 | 0.0508 | −45.152 | 0.0231 | −45.704 | 0.0574 | −45.636 | 0.0488 | −45.116 | 0.0555 |
| −39.3 | 0.0657 | −39.908 | 0.0709 | −40 | 0.0271 | −40.46 | 0.0741 | −40.208 | 0.0658 | −39.688 | 0.0809 |
| −35.62 | 0.0775 | −35.216 | 0.0931 | −35.308 | 0.0346 | −34.848 | 0.105 | −34.596 | 0.0859 | −35.916 | 0.1100 |
| −30.008 | 0.114 | −30.156 | 0.136 | −30.616 | 0.0491 | −30.984 | 0.1420 | −30.824 | 0.11 | −30.488 | 0.1750 |
| −24.212 | 0.203 | −25.464 | 0.217 | −25.28 | 0.0963 | −25.28 | 0.2570 | −25.396 | 0.174 | −24.324 | 0.3200 |
| −20.716 | 0.316 | −20.864 | 0.36 | −19.024 | 0.328 | −19.76 | 0.4740 | −19.784 | 0.32 | −19.172 | 0.476 |
| −15.012 | 0.66 | −15.16 | 0.625 | −15.896 | 0.557 | −15.896 | 0.574 | −15.46 | 0.477 | −15.308 | 0.444 |
| −9.4 | 0.626 | −10.1 | 0.518 | −10.008 | 0.469 | −10.284 | 0.407 | −10.124 | 0.417 | −9.512 | 0.299 |
| −5.72 | 0.427 | −5.132 | 0.343 | −5.132 | 0.304 | −5.04 | 0.27 | −4.696 | 0.275 | −4.268 | 0.215 |
| 0.076 | 0.264 | −0.532 | 0.24 | −0.532 | 0.214 | 0.664 | 0.19 | 0.64 | 0.189 | −0.404 | 0.184 |
| 5.412 | 0.168 | 5.632 | 0.162 | 5.54 | 0.147 | 4.528 | 0.167 | 4.688 | 0.16 | 4.932 | 0.168 |
| 9.368 | 0.125 | 9.772 | 0.14 | 9.772 | 0.132 | 10.048 | 0.161 | 10.116 | 0.147 | 10.636 | 0.165 |
| 14.704 | 0.11 | 14.372 | 0.134 | 14.372 | 0.12 | 15.66 | 0.162 | 15.452 | 0.147 | 14.316 | 0.167 |
| 20.132 | 0.1 | 19.984 | 0.132 | 19.8 | 0.119 | 19.156 | 0.162 | 19.316 | 0.152 | 20.02 | 0.169 |
| 26.02 | 0.097 | 25.044 | 0.136 | 25.872 | 0.122 | 24.676 | 0.162 | 24.744 | 0.154 | 25.54 | 0.171 |
| 29.424 | 0.095 | 30.472 | 0.132 | 30.748 | 0.12 | 30.38 | 0.16 | 30.54 | 0.16 | 29.036 | 0.165 |
| 35.312 | 0.093 | 35.716 | 0.134 | 34.796 | 0.127 | 35.9 | 0.159 | 36.152 | 0.165 | 34.74 | 0.169 |
| 41.108 | 0.091 | 40.5 | 0.136 | 39.212 | 0.129 | 39.856 | 0.161 | 39.74 | 0.165 | 40.536 | 0.165 |
| 46.168 | 0.0906 | 45.008 | 0.134 | 44.548 | 0.123 | 45.284 | 0.159 | 45.628 | 0.173 | 45.964 | 0.167 |
| 50.216 | 0.089 | 50.988 | 0.136 | 50.896 | 0.122 | 50.712 | 0.161 | 50.964 | 0.18 | 49.828 | 0.162 |
| 55.552 | 0.089 | 55.404 | 0.134 | 55.588 | 0.124 | 54.76 | 0.168 | 54.828 | 0.185 | 55.256 | 0.1653 |
| 59.508 | 0.09 | 59.176 | 0.13 | 59.084 | 0.1233 | 60.096 | 0.163 | 60.164 | 0.1852 | 60.408 | 0.169 |
| 65.396 | 0.0854 | 65.8 | 0.123 | 65.892 | 0.1167 | 65.616 | 0.169 | 65.592 | 0.179 | 64.456 | 0.169 |
| 70.456 | 0.083 | 70.032 | 0.121 | 69.848 | 0.11175 | 69.756 | 0.171 | 69.732 | 0.187 | 69.792 | 0.168 |
| 74.596 | 0.079 | 74.448 | 0.115 | 74.54 | 0.1068 | 75.092 | 0.164 | 75.16 | 0.183 | 75.68 | 0.159 |
| 79.656 | 0.076 | 80.98 | 0.1125 | 80.704 | 0.10335 | 80.428 | 0.16 | 80.404 | 0.1783 | 79.268 | 0.156 |
| 85.176 | 0.0752 | 85.948 | 0.123 | 85.028 | 0.105 | 84.476 | 0.163 | 84.544 | 0.183 | 84.604 | 0.152 |
| 89.316 | 0.0735 | 90.64 | 0.12 | 90.64 | 0.11 | 89.628 | 0.163 | 89.512 | 0.17 | 90.4 | 0.166 |
| 94.468 | 0.0729 | 95.148 | 0.117 | 94.78 | 0.112 | 95.516 | 0.162 | 95.584 | 0.167 | 96.288 | 0.162 |
| 100.356 | 0.0721 | 100.852 | 0.117 | 100.668 | 0.113 | 99.288 | 0.16 | 99.264 | 0.163 | 99.508 | 0.15 |
| 106.06 | 0.0721 | 105.544 | 0.117 | 104.44 | 0.113 | 104.348 | 0.159 | 104.508 | 0.164 | 105.396 | 0.148 |
| 109.188 | 0.0721 | 110.512 | 0.117 | 110.052 | 0.113 | 110.328 | 0.158 | 110.212 | 0.165 | 109.076 | 0.142 | in a tire. A tire made from rubber having a high value of the ratio of tan δ at 0° C. to tan δ at 80° C. may perform better than a tire made from rubber having a low ratio of tan δ at 0° C. to tan δ at 80° C. The tire may perform better in that it may have better traction in wet or icy conditions and/or lower rolling resistance for longer tire life and lower fuel consumption.

For examples 44, 45 and 46, which use fluffy carbon black, the ratio of tan δ at 0° C. to tan δ at 80° C. is 4.02, 2.19 and 2.25, respectively, which is considerably higher than the values 1.33, 1.19 and 1.32 for the ratios in examples 47, 48 and 49, respectively, in Table 7, which use ground pellets. These values indicate that rubber made according to the present invention, as illustrated in examples 44, 45 and 46, performs better and would make tires that perform better than prior art rubber and tires. Thus, the present invention includes a carbon-filled rubber having a ratio of tan δ at 0° C. to tan δ at 80° C. that exceeds about 1.5, preferably With reference to FIG. 8 and to Table 8, example 44, which is a fluffy carbon black sample, is particularly dramatic with the highest tan δ value (0.626) of all of the examples 44–49 at about −10° C. (−9.4° C.) as compared to the pellet carbon black sample of example 49, which is the lowest tan δ value (0.299) of all of the examples 44–49 at about −10° C. (−9.5° C.). At about −10° C., the fluffy samples in examples 44–46 have an average tan δ value of 0.538 while the pellet samples in examples 47–49 have an average tan δ value of 0.374. The higher value of tan δ for the fluffy samples at the low temperature of about −10° C. indicates that tires made according to the present invention will have better traction in rainy and icy conditions.

At high temperatures, one prefers a low value of tan δ as this indicates good rolling resistance for long wear of tires and lower fuel consumption for the vehicle that uses the tires. At about 80° C., the fluffy sample in example 44 again provides the best results with the lowest value of tan δ, 0.076, as compared to pellet example 48, which has the highest value of tan δ at 0.1783. The fluffy samples in examples 44–46 have an average tan δ value of 0.973 while the pellet samples in examples 47–49 have an average tan δ value of 0.165, when measured at about 80° C. These values at the high temperature of about 80° C. indicate that tires made with rubber according to the present invention will have better rolling resistance performance than tires made with prior art carbon-filled rubber. The other curves in FIG. 8 support the assertion that rubber products and tires made with the present inventive rubber will perform better than if made using prior art rubber.

A further experiment was conducted to compare the performance properties of rubber made in which ground pellets of carbon black was mechanically mixed with rubber to rubber made according to the present invention. The results are provided in Table 9.

TABLE 9

| Parameter and Test Method | Mechanically Mixed Rubber Compound | Inventive Rubber Compound |
|---|---|---|
| Rheometric Properties, ASTM D-2084 method, Temp. 150° C., Arc 1, Range 0–100. Rheometer "RPA - 2000". | | |
| Minimum Torque ML (lb-in) | 1.1 | 1.1 |
| Maximum Torque MH (lb-in) | 8.59 | 7.77 |
| Scorch time TS + 1 (minutes) | 4.45 | 3.1 |
| Scorch time TS + 2 (minutes) | 5.24 | 3.58 |
| Cure time Tc50% (minutes) | 6.68 | 4.27 |
| Cure time Tc90% (minutes) | 11.7 | 7.28 |
| Hardness Shore A Method DIN 53505 | | |
| Hardness | 59 | 63 |
| Abrasion Test. ASTM D 3186. | | |
| Abrasion (mm³) | 124 | 105 |
| Tensile test: Method ASTM D-412 (Modulus, Tensile, Elongation). | | |
| Modulus 300% of Elongation (psi). | 868 | 900 |
| Tension to breaking (psi). | 2533 | 2740 |
| Elongation to breaking (%) | 657 | 670 |
| Mooney Viscosity ASTM D 1646 Test Temperature = 100° C. Test Time = 4 min. | | |
| Mooney Viscosity | 43 | 45 |

With reference to Table 9, maximum torque or MH indicates the amount of energy required for a Banbury mixer. Mixing energy is a function of torque times the rpm of the mixer. Lower values for maximum torque indicate that less energy is required as compared to higher values. Since the present inventive carbon-filled rubber has a value of 7.77 lb-in as compared to the prior art mechanically mixed carbon-filled rubber, which has a value of 8.59 lb-in, less energy would be required to mix the inventive carbon-filled rubber as compared to the prior art mechanically mixed carbon-filled rubber. This is important because both rubber materials would need to be mixed with or compounded with sulfur, as well as possibly other additives, before vulcanization. This mixing energy is an expense incurred by tire and other rubber product manufacturers, which expense can be lowered by using the carbon-filled rubber of the present invention.

The scorch time, TS+1 and TS+2, which is the number of minutes required to rise 1 unit above the minimum torque or ML, provides an indication of cure time, where lower values indicate a shorter cure time, shorter mixing time and higher productivity as compared to higher values. The inventive carbon-filled rubber has a TS+1 and TS+2 scorch time of 3.1 and 3.58 minutes as compared to 4.45 and 5.24 minutes, respectively, which indicates that carbon-filled rubber made according to the present invention will cure quicker than prior art carbon-filled rubber. A shorter cure time would increase the productivity of a tire and other rubber product manufacturer, allowing more tires or rubber products to be made in a given period of time.

The cure time measurements of Tc50% and Tc90% also indicate how much time is required to cure rubber, and low values mean shorter, and thus better, cure times. The measurement of Tc50% is the number of minutes required to achieve 50% of the maximum torque value, the measurement of Tc90% is the number of minutes required to achieve 90% of the maximum torque value. Carbon-filled rubber made according to the present invention has values of 4.27 and 7.28 minutes for Tc50% and Tc90%, respectively, as compared to 6.68 and 11.7 minutes for Tc50% and Tc90% for the prior art carbon-filled rubber. The carbon-filled rubber made according to the present invention will thus have a shorter cure time than the prior art carbon-filled rubber and thus higher productivity can be achieved by tire and other rubber product manufacturers when using the present inventive carbon-filled rubber.

A higher value for hardness is better for tire tread applications. The carbon-filled rubber made according to the present invention has a hardness of 63 as measured using the hardness Shore A Method identified as DIN 53505 while the prior art rubber made with ground carbon black pellets has a lower hardness value of 59. Since a hardness of 63 is greater than a hardness of 59, the inventive rubber is better for tire tread applications than prior art carbon-filled rubber.

Abrasion test ASTM D3186 measures the amount (volume in mm³) of rubber removed by abrading a sample of rubber, where the less rubber removed indicates better performance. In the abrasion test, the inventive rubber yielded 105 mm³ of rubber removed while the prior art rubber allowed 124 mm³ of rubber to be removed. Thus, a tire tread made using the inventive rubber would not wear off of a tire as quickly as a tire tread made using prior art rubber.

Overall, carbon-filled rubber made according to the present invention has better performance parameters than carbon-filled rubber made by mechanically mixing ground carbon black pellets into rubber. While the minimum torque and Mooney viscosity values are about the same between the inventive rubber and the prior art rubber, all of the other parameters shown in Table 9 indicate that the inventive rubber will perform better than the prior art rubber. The inventive rubber provides better parameters in the end product, allows lower manufacturing costs, and increases manufacturing productivity.

With carbon-filled rubber made according to the present invention, a tire or rubber products manufacturer can produce a product with superior performance to prior art products with presumably about the same raw material cost for the rubber and carbon black as required for the prior art products. However, because the cohesive forces between the rubber and carbon black particles are apparently greater in the inventive carbon-filled rubber, one can use less carbon black than in the prior art material to achieve performance properties comparable to the performance of prior art tires and rubber products. Thus, a tire or rubber product manufacturer has the option to lower its cost for the carbon black raw material, since less carbon black is required, while achieving performance equivalent to that provided by prior art tires and rubber products.

Figure 9:
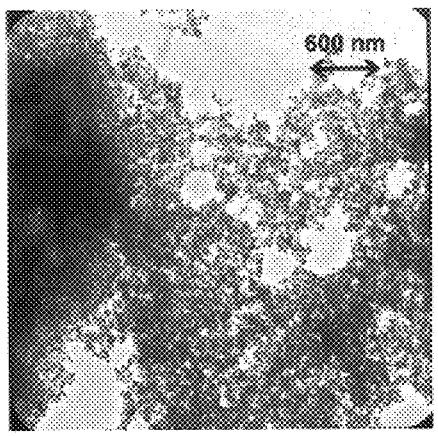
FIG. 9 is a microphotograph of fluffy carbon black dispersed in water and magnified 20000 times.
Figure 10:
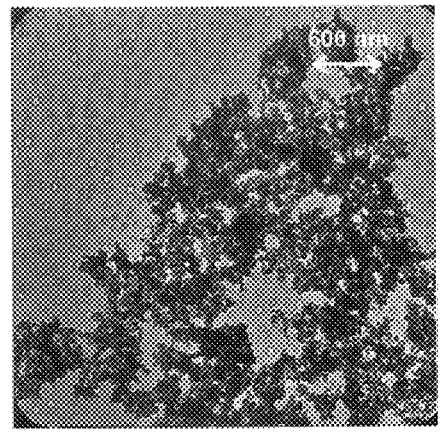
FIG. 10 is a microphotograph of ground carbon black carbon black pellets dispersed in water and magnified 20000 times.
Figure 11:
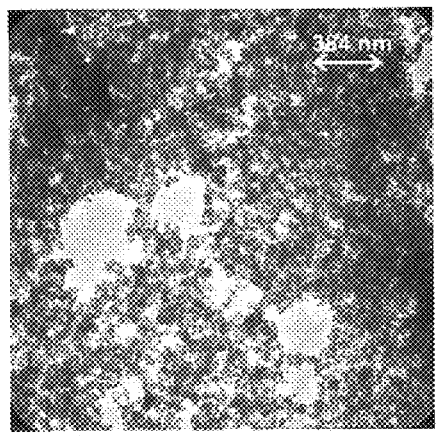
FIG. 11 is a microphotograph of fluffy carbon black dispersed in water and magnified 31500 times.
Figure 12:
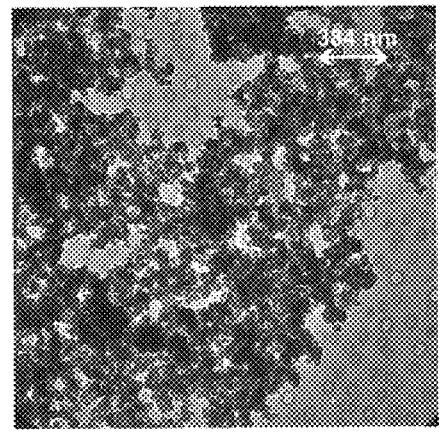
FIG. 12 is a microphotograph of ground carbon black carbon black pellets dispersed in water and magnified 31500 times.

Next, a transmission electron microscopy (TEM) study was completed to compare the inventive rubber to prior art rubber. ASTM Method D-3849 was used with a slight modification to use osmium tetra-oxide to color or tincture the butadiene rubber. Photographs or photomicrographs from a transmission electron microscope are presented in FIGS. 9–16. Distances in the actual sample are indicated by the tip-to-tip distance between the arrowheads shown in the figures; 600 nm for FIGS. 9, 10, 13 and 14 and 384 nm for FIGS. 11, 12, 15 and 16. In FIGS. 9–12, about 1.0 milligram of carbon black has been dispersed in about 1.0 liter of water, where FIGS. 9 and 11 are TEM photomicrographs of N-234 fluffy carbon black dispersed in water without a dispersant. FIGS. 10 and 12 are N-234 carbon black ground from pellets that has been dispersed in water in the same concentration and also without a dispersant.

FIGS. 9 and 10 are TEM photomicrographs at a magnification of 20000 times the original size (20000×), while FIGS. 11 and 12 are TEM photomicrographs at a magnification of 31500 times the original size (31500×). To interpret these TEM photomicrographs, one compares the lighter-tone areas of FIGS. 9 and 11, which show the fluffy carbon black, with the lighter-tone areas in FIGS. 10 and 12, which show the ground carbon black. Carbon black has a natural tendency to agglomerate when dispersed in water. The darker-tone areas are clumps of carbon black that have naturally agglomerated. The lighter-tone areas show individual particles of carbon black dispersed in water, and a darker color in a lighter-tone area indicates that larger particles are present than the particles in a lighter color in a lighter-tone area.

No attempt is made in this TEM study to determine the actual particle sizes but rather the relative particle sizes. Comparing the lighter-tone area of FIG. 9, fluffy carbon black, with the lighter-tone area of FIG. 10, ground carbon black, one can see that the lighter-tone area in FIG. 10, ground carbon black, is darker than the lighter-tone area of FIG. 9 for the fluffy carbon black. This indicates that the particles obtained by first grinding a pellet of carbon black are larger than the particles obtained from fluffy carbon black that has never been made into pellets. It is confirmed in FIGS. 11 and 12 that the particle size of fluffy carbon black is smaller than the particle size of ground carbon black because the lighter-tone area in FIG. 12 is darker than the lighter-tone area of FIG. 11.

The fractal structure agglomerate density is thus higher for the ground pellets in FIGS. 10 and 12 than for the fluffy carbon black samples in FIGS. 9 and 11. These microphotographs in this TEM study tend to confirm the results of measuring particle size distribution using the Horiba Model LA-910, which was discussed above with reference to Table 1 and FIG. 3. The particle size distribution as measured using the Horiba Model LA-910 showed that the largest fluffy carbon black particles tended to be less than about 2.0 microns, while the largest particle size of the ground carbon black approached 7.0 microns with over 10% of the particles in ground carbon black being larger than the largest particle of fluffy carbon black.

Turning now to FIGS. 13 through 16, TEM microphotographs are provided to compare a commercial sample of a prior art carbon-filled rubber (in FIGS. 14 and 16) to the present inventive carbon-filled rubber (in FIGS. 13 and 15), where the prior art rubber was presumably made by first grinding carbon black pellets and then compounding the ground carbon black by dry mixing it with rubber. For the present inventive carbon-filled rubber, a fluffy carbon slurry was added to latex before coagulation occurred and was mixed with the latex before and during the coagulation step. The present inventive carbon-filled rubber was then recovered as described above with reference to FIGS. 2A and 2B.

A more homogeneous dispersion is achieved when less contrast is observed in the microphotographs (i.e.; not very black and not very white). A completely black area means no dispersion of carbon black. A gray homogeneous tone is preferred to a mixture of discrete black and white areas. A dark area means no dispersion of carbon black, and this is bad from the mechanical properties point of view due to the fact that this area is a very weak point where rupture can occur.

It is desirable to have a uniform dispersion of carbon black particles in rubber because a uniform dispersion imparts superior properties in the carbon-filled rubber. With reference to FIGS. 13–16, a light-colored area in one of these TEM microphotographs indicates a lack of carbon black, while very dark areas indicate a very high density of carbon black, either of which indicates an undesirable lack of homogeneity. At 20000×, comparing the prior art rubber shown in FIG. 14 to the inventive rubber shown in FIG. 13, one sees a light-colored area in the prior art rubber of FIG. 14 but not in the inventive rubber of FIG. 13. This indicates greater homogeneity of the dispersion of the fluffy carbon black particles in the rubber as compared to the prior art carbon-filled rubber shown in FIG. 14. This greater homogeneity in the dispersion of the fluffy carbon black particles helps to explain the superior properties that have been described above for rubber made according to the present invention.

Figure 13:
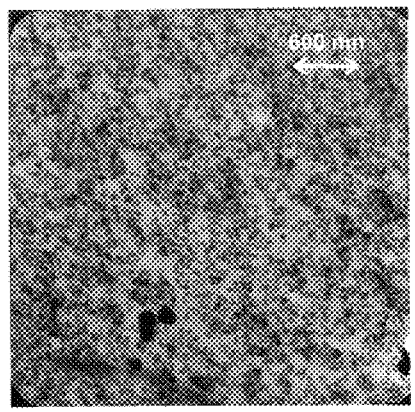
FIG. 13 is a microphotograph of black masterbatch rubber or carbon-filled rubber made according to the present invention and magnified 20000 times.
Figure 14:
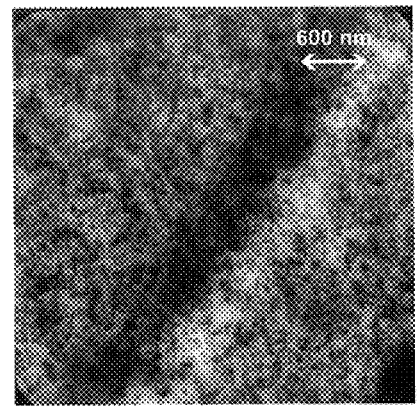
FIG. 14 is a microphotograph at 20000 times magnification of black masterbatch rubber or carbon-filled rubber made by grinding carbon black pellets and compounding the ground carbon black by dry mixing it with rubber.
Figure 15:
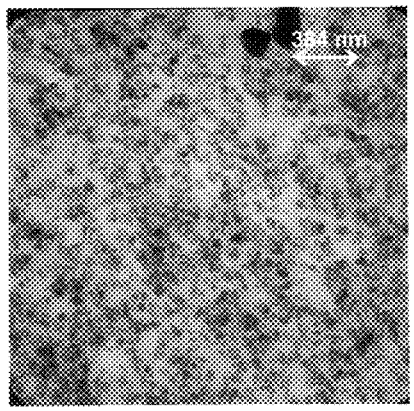
FIG. 15 is a microphotograph of black masterbatch rubber or carbon-filled rubber made according to the present invention and magnified 31500 times.
Figure 16:
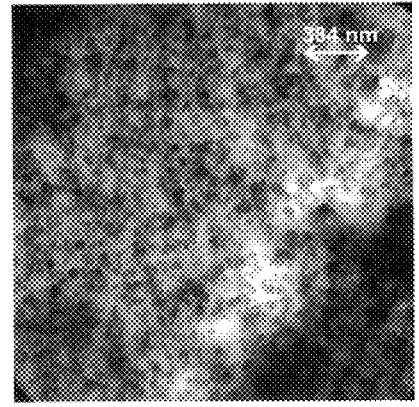
FIG. 16 is a microphotograph at 31500 times magnification of black masterbatch rubber or carbon-filled rubber made by grinding carbon black pellets and compounding the ground carbon black by dry mixing it with rubber.

FIGS. 15 and 16, which are like FIGS. 13 and 14, respectively, but at 31500× rather than 20000×, further confirm the observations made with respect to FIGS. 13 and 14. The inventive rubber in FIG. 15 has a homogeneous or uniform appearance, which is good, and the prior art black masterbatch in FIG. 16 has a very light region, which indicates a lack of carbon black, and a very dark region, which indicates a high density of carbon black. While prior art black masterbatch has generally performed well in its end uses, the uniformity seen in FIG. 15 indicates that superior performance can be obtained in end products that incorporate rubber or polymer made according to the present invention.

The TEM photomicrographs shown in the figures can be analyzed using digital image analysis based on gray scale level. With this technique the highly homogeneous dispersion in the inventive carbon-filled rubber indicated by the gray tone can be quantitatively analyzed and compared to the less homogeneous TEM photomicrographs of the prior art material. This is done by analyzing the color itself—black, white and the many shades of gray in between. Thus, the inventive material can be defined by the results obtained from digital image analysis. Further, particle sizes, and thus particle size distribution, can be determined using digital image analysis on these TEM photomicrographs, which can further define the inventive carbon-filled rubber.

In summary, a process is provided for making a carbon-filled rubber that includes the steps of forming a rubber intermediate; adding a fluffy carbon black stream to the rubber intermediate; incorporating fluffy carbon black to form a rubber having carbon black dispersed therethrough; and processing the mixture of carbon black and rubber to form a carbon-filled rubber. In one embodiment the rubber intermediate is a latex in an emulsion styrene-butadiene plant. The fluffy carbon black is preferably received as a slurry of fluffy carbon black in water; and optionally, a dispersant can be added to aid in dispersing the fluffy carbon black in the water to form the fluffy carbon black slurry. The dispersant is preferably a naphthalenesulfonate composition although other dispersants can be used.

In one aspect of the invention, the process further includes operating a carbon black plant to form a fluffy carbon black intermediate that can be used as the source of fluffy carbon black stream. The fluffy carbon black intermediate is withdrawn upstream of agglomeration or pelletizing equipment, or the carbon black plant does not have agglomeration or pelletizing equipment so that in either case the fluffy carbon black intermediate has not been agglomerated or pelletized. In another aspect the average particle size of the fluffy carbon black intermediate is less than about 1000 nm when dispersed in water, and/or about 95% of the carbon black particles may be less than 2000 nm.

In another aspect of the invention, a process is provided for making rubber containing carbon black that includes the steps of feeding a fuel to a reactor for maintaining the reactor at an elevated temperature; feeding a hydrocarbon-based feedstock to the reactor; feeding air to the reactor; reacting the air with the hydrocarbon-based feedstock to form a carbon black smoke; quenching the reaction; recovering a fluffy carbon black intermediate from the carbon black smoke; adding water to the fluffy carbon black intermediate to form a fluffy carbon black solution; removing grit from the fluffy carbon black solution to form a fluffy carbon black slurry; operating a rubber manufacturing plant capable of making rubber; receiving the fluffy carbon black slurry; adding the fluffy carbon black slurry to an intermediate step in the process for making rubber; incorporating the fluffy carbon black into rubber to make rubber containing carbon black; and processing the rubber containing carbon black to make black masterbatch rubber.

Another embodiment of the invention includes an integrated plant for making black masterbatch rubber that includes a carbon black plant capable of making a fluffy carbon black intermediate; means for making a fluffy carbon black stream; a rubber manufacturing plant adjacent to the carbon black plant; means for conveying the fluffy carbon black stream to the rubber manufacturing plant; means for incorporating fluffy carbon black into rubber; and means for making a black masterbatch rubber that contains fluffy carbon black.

A process for making a fluffy carbon black slurry is provided that comprises feeding a fuel to a reactor for maintaining the reactor at an elevated temperature; feeding a hydrocarbon-based feedstock to the reactor; feeding air to the reactor; reacting the air with the hydrocarbon-based feedstock to form a carbon black smoke; quenching the reaction; recovering a fluffy carbon black intermediate from the carbon black smoke; adding water to the fluffy carbon black intermediate to form a fluffy carbon black solution; and removing grit from the fluffy carbon black solution to form a fluffy carbon black slurry. Preferably, the concentration of carbon black in the fluffy carbon black slurry is less than about 15 weight percent and, more preferably, less than about 11 weight percent.

A process for making black masterbatch rubber is provided that comprises feeding a fuel to a reactor for maintaining the reactor at an elevated temperature; feeding a hydrocarbon-based feedstock to the reactor; feeding air to the reactor; reacting the air with the hydrocarbon-based feedstock to form a carbon black smoke; quenching the reaction; recovering a fluffy carbon black intermediate from the carbon black smoke; adding water to the fluffy carbon black intermediate to form a fluffy carbon black solution; removing grit from the fluffy carbon black solution to form a fluffy carbon black slurry; operating a rubber manufacturing plant capable of making rubber; receiving the fluffy carbon black slurry; adding the fluffy carbon black slurry to an intermediate step in the process for making rubber; incorporating the fluffy carbon black into rubber to make rubber containing carbon black; and processing the rubber containing carbon black to make black masterbatch rubber.

An integrated plant for making black masterbatch rubber is provided that comprises a carbon black plant capable of making a fluffy carbon black intermediate; means for making a fluffy carbon black stream; a rubber manufacturing plant adjacent to the carbon black plant; means for conveying the fluffy carbon black stream to the rubber manufacturing plant; means for incorporating the fluffy carbon black stream into rubber; and means for making a black masterbatch rubber that contains fluffy carbon black. Preferably, a tire or rubber manufacturing plant is further integrated with and adjacent to the integrated plant for making black masterbatch rubber.

A method is provided for improving the efficiency of making vehicle tires or rubber products. The steps include idling equipment and facilities at a tire or rubber product manufacturing facility used for receiving, handling and grinding agglomerated or pelletized carbon black; idling equipment at a carbon black plant used for agglomerating or pelletizing a fluffy carbon black intermediate; idling equipment at a carbon black plant used for storing and handling agglomerated or pelletized carbon black; forming a fluffy carbon black stream with the fluffy carbon black intermediate; conveying the fluffy carbon black stream to a manufacturing plant used for making rubber; adding the fluffy carbon black stream to an intermediate stage in making rubber at the rubber manufacturing plant; incorporating fluffy carbon black in rubber produced at the rubber manufacturing plant to make a black masterbatch product; shipping the black masterbatch product to the tire or rubber product manufacturing facility; and using the black masterbatch product to make a tire or a rubber product. The black masterbatch product preferably has a ratio of tan δ at 0° C. to tan δ at 80° C. that exceeds about 1.5 and preferably exceeds about 2.0.

A carbon-filled rubber is provided, which is made in a process that incorporates a step of adding fluffy carbon black during the process of making rubber. The carbon-filled rubber has a distribution of carbon particle sizes where about 99% of the particles are less than about 2 microns in diameter, and the particle size distribution is not significantly skewed, but rather is a nearly normal, bell-shaped curve. The carbon-filled rubber is defined or identified by a digital image analysis, based on gray scale level, of FIGS. 4, 13 and/or 15 as compared to FIGS. 5, 14 and/or 16, respectively.

Although specific embodiments of the invention have been illustrated and described, it should be noted that numerous possible modifications can be made that are within the scope of the claimed invention. Therefore, the present invention should not be construed as restricted or limited by the description of the specific embodiments or the examples, but rather the present invention should be construed in the spirit of the appended claims.

What is claimed is:

1. A process for making black masterbatch rubber, the black masterbatch rubber comprising rubber and carbon black, wherein the carbon black is made at a carbon black plant, the process comprising the steps of:

operating a rubber manufacturing plant capable of making rubber through a series of processing steps, the series of processing steps including steps for receiving and polymerizing one or more monomers;

receiving a fluffy carbon black stream from the carbon black plant, wherein the fluffy carbon black stream comprises from about 1 to about 50 weight percent fluffy carbon black slurried in a liquid or fluidized in a gas, and wherein the fluffy carbon black has not been densified, pelletized or agglomerated and has a bulk density of about 0.05 g/cc;

incorporating the fluffy carbon black into a step in the series of processing steps to make rubber containing carbon black; and processing the rubber containing carbon black to make black masterbatch rubber.

2. The process of claim 1, wherein the fluffy carbon black stream is conveyed from the carbon black plant to the rubber manufacturing plant via pipe, truck or rail car.

3. The process of claim 1, wherein the fluffy carbon black stream is a liquid slurry.

4. The process of claim 3, wherein the fluffy carbon black comprises less than about 25 weight percent of the liquid slurry.

5. The process of claim 3, wherein the fluffy carbon black comprises less than about 10 weight percent of the liquid slurry.

6. The process of claim 1, wherein the fluffy carbon black stream is a water-based slurry containing between about 5 and about 8 weight percent fluffy carbon black.

7. The process of claim 3, wherein a dispersant is added to water to disperse fluffy carbon black in the water to form the slurry containing fluffy carbon black, and wherein the dispersant is selected from the group consisting of naphthalenesulfonate, sodium naphthalenesulfonate, sodium naphthalenesulfonate polymer, sodium naphthalenesulfonate polymer with formaldehyde, alkylene oxide block co-polymer, sulfosuccinamate, octadecyl sulfosuccinamate, tretrasodium sulfosuccinamate tricarboxilate, sodium dioctyl sulfosuccinamate, tretrasodium N-(1,2-dicarboxyethyl)-N-octadecyl sulfosuccinamate, sodium bis(tridecyl) sulfosuccinamate, polyacrylic acid, sulfated alkyl-aryl ether, monoester phosphate and diester phosphate.

8. The process of claim 7, wherein the dispersant concentration in the slurry containing fluffy carbon black is less than about 20 parts of dispersant per hundred parts of carbon black by weight.

9. The process of claim 1, wherein the fluffy carbon black stream is a liquid slurry, further comprising adding a dispersant to the liquid slurry, wherein the dispersant is in a solution having a pH between about 8 and about 11, and wherein the concentration of fluffy carbon black in the liquid slurry is less than about 11 weight percent.

10. The process of claim 9, wherein the weighted average particle size of the fluffy carbon black is less than about 700 nanometers (nm).

11. The process of claim 1, wherein the weighted average particle size of the fluffy carbon black is less than about 700 nm when dispersed in water, and wherein the distribution of the particle size of the carbon black is a nearly normal bell-shaped curve without significant skewness.

12. The process of claim 1, wherein at least about 95% of the particles of fluffy carbon black have a size less than about 2000 nm.

13. The process of claim 1, wherein the fluffy carbon black stream is a fluffy carbon black slurry formed by mixing water and fluffy carbon black together, and further comprising removing grit from the fluffy carbon black slurry.

14. The process of claim 13, wherein the process for making black masterbatch rubber is an emulsion styrene-butadiene rubber process having a coagulation step, and wherein the coagulation step is performed at a pH between about 3 and about 5.

15. The process of claim 14, wherein the coagulation step is performed at a temperature between about 65 degrees C. and about 75 degrees C.

16. The process of claim 15, wherein the coagulation step is performed at a temperature of about 70 degrees C.

17. The process of claim 16, wherein a dispersant is added to water to disperse fluffy carbon black in the water to form the fluffy carbon black slurry, and wherein the dispersant is selected from the group consisting of a naphthalenesulfonate, sodium naphthalenesulfonate, sodium naphthalenesulfonate polymer, sodium naphthalenesulfonate polymer with formaldehyde, alkylene oxide block co-polymer, sulfosuccinamate, octadecyl sulfosuccinamate, tretrasodium sulfosuccinamate tricarboxilate, sodium dioctyl sulfosuccinamate, tretrasodium N-(1,2-dicarboxyethyl)-N-octadecyl sulfosuccinamate, sodium bis(tridecyl) sulfosuccinamate, polyacrylic acid, sulfated alkyl-aryl ether, monoester phosphate and diester phosphate.

18. The process of claim 1, wherein the fluffy carbon black stream is a fluffy carbon black slurry formed by mixing water and a fluffy carbon black intermediate together, and wherein a dispersant comprising a naphthalenesulfonate-based material is added.

19. The process of claim 1, wherein the process comprises a batch, a semi-batch or a continuous process.

20. The process of claim 19, wherein the process comprises cold and hot processes and batch, semi-batch or continuous solution processes.

21. The processes of claim 1, wherein the process is used to make a black masterbatch rubber that includes a rubber selected from the group consisting of styrene butadiene rubber, nitrile butadiene rubber, natural rubber, carboxylated styrene butadiene rubber and carboxylated nitrile butadiene rubber.

22. The process of claim 1, wherein the black masterbatch rubber is in the form of bales, crumb, flakes or powder.

23. A process for making rubber containing carbon black, the carbon black being made at a carbon black plant, comprising:

feeding monomers to a reactor;

forming a latex from the monomers;

receiving fluffy carbon black in a liquid slurry from the carbon black plant, the slurry containing from about 3 to about 25 weight percent carbon black;

adding the fluffy carbon black to the latex, wherein fluffy carbon black is a form of carbon black that has not been densified, pelletized or agglomerated, and wherein the fluffy carbon black has a bulk density of about 0.05 g/cc;

coagulating the latex to form a rubber having carbon black dispersed therethrough; and washing and drying the rubber.

24. The process of claim 23, wherein the weighted average particle size of the fluffy carbon black is less than about 700 nm.

25. The process of claim 23, wherein the size of the largest particle of carbon black in the rubber is less than about 3 microns.

26. The process of claim 23, wherein the slurry has been processed through a grit removal unit.

27. The process of claim 23, wherein the rubber has a ratio of tan δ at 0° C. to tan δ at 80° C. that exceeds about 1.5.

28. The process of claim 23, wherein the size of the largest particle of carbon black in the rubber is less than about 3 microns, and wherein the rubber has a ratio of tan δ at 0° C. to tan δ at 80° C. that exceeds about 2.0.

29. The process of claim 13, wherein grit is removed by passing the fluffy carbon black slurry through a settling tank, and wherein the grit settles out in the settling tank.

30. A process for making rubber, comprising:
   forming a rubber material through a series of processing steps, including a step for reacting one or more monomers;
   dispersing carbon black throughout the rubber material by incorporating carbon black into a step in the series of processing steps, wherein the carbon black is received form a carbon black plant as a liquid slurry containing between about 0.5 and about 50 weight percent carbon black, and wherein the carbon black has been de-gritted.

31. The process of claim 30, wherein the carbon black is not densified and has a particle size range of from about 100 nm to about 2000 nm as measured by a laser light scattering instrument.

32. The process of claim 30, wherein a black masterbatch rubber is formed having a tan $\delta$ at 0° C. of about 0.22 or higher and a tan $\delta$ at 60° C. of about 0.13 or less.

33. The process of claim 1, wherein the black masterbatch rubber has a tan $\delta$ at 0° C. of about 0.22 or higher and a tan $\delta$ at 60° C. of about 0.13 or less.

34. The process of claim 1, wherein the black masterbatch rubber has a TS+1 scorch time of about 3.1 minutes and a TS+2 scorch time of about 3.6 minutes.

35. The process of claim 1, wherein the difference between the tan $\delta$ value at 0° C. and the tan $\delta$ value at 60° C. for the black masterbatch rubber is greater than about 0.09.

* * * * *